United States Patent
Nagai

(10) Patent No.: US 11,609,687 B2
(45) Date of Patent: *Mar. 21, 2023

(54) APPARATUS, METHOD AND PROGRAM FOR PROCESSING DATA

(71) Applicant: FURUNO ELECTRIC CO., LTD., Nishinomiya (JP)

(72) Inventor: Sanae Nagai, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,041

(22) Filed: Aug. 24, 2022

(65) Prior Publication Data

US 2022/0404936 A1 Dec. 22, 2022

Related U.S. Application Data

(63) Continuation of application No. 17/219,426, filed on Mar. 31, 2021, now Pat. No. 11,494,059, which is a
(Continued)

(30) Foreign Application Priority Data

May 14, 2019 (JP) .............................. JP2019-091605

(51) Int. Cl.
  *G06F 3/0484* (2022.01)
  *G06F 3/04883* (2022.01)
(52) U.S. Cl.
  CPC ........ *G06F 3/0484* (2013.01); *G06F 3/04883* (2013.01)

(58) Field of Classification Search
  None
  See application file for complete search history.

(56) References Cited

U.S. PATENT DOCUMENTS 5,303,337 A   4/1994  Ishida
8,819,591 B2* 8/2014  Wang .................. G06F 3/04815
                                              715/850
(Continued)

FOREIGN PATENT DOCUMENTS

JP  H03-250267 A  11/1991
JP  H07-141530 A   6/1995
JP  2007-111763 A  5/2007

OTHER PUBLICATIONS 8.14.4 Rotating, Resizing, Stretching and Skewing 3D Graphs; OriginLab; online, URL: https://www.originlab.com/doc/Origin-Help/3DGraph-Transform. Dec. 21, 2018.
(Continued)

*Primary Examiner* — Tuan S Nguyen
(74) *Attorney, Agent, or Firm* — Studebaker & Brackett PC

(57) ABSTRACT

A data processing apparatus is provided, which includes processing circuitry. The processing circuitry is configured to acquire a data set from target detected by a detection apparatus, perform rendering of the data set, and generate a plurality of views arranged on a screen. Each view of the plurality of views includes a plurality of pixels. Each pixel included in the plurality of views is associated with a plurality of pieces of information including a first information displayed on the screen and a second information that indicates a view among the plurality of views to which the pixel belongs.

18 Claims, 24 Drawing Sheets

Related U.S. Application Data continuation of application No. 16/846,013, filed on Apr. 10, 2020, now Pat. No. 10,996,829.

(56) References Cited

U.S. PATENT DOCUMENTS

| | | | |
|---|---|---|---|
| 9,606,584 B1* | 3/2017 | Fram | G06F 1/1694 |
| 2007/0100492 A1 | 5/2007 | Idaka et al. | |
| 2010/0321380 A1* | 12/2010 | Lee | G06T 15/20 |
| | | | 345/419 |
| 2013/0187903 A1* | 7/2013 | Papageorgiou | G06T 19/00 |
| | | | 345/419 |
| 2013/0326425 A1* | 12/2013 | Forstall | G01C 21/3673 |
| | | | 715/851 |
| 2013/0342391 A1 | 12/2013 | Hoang et al. | |
| 2015/0035772 A1 | 2/2015 | Asahara et al. | |
| 2020/0042156 A1* | 2/2020 | Trabold | G06F 16/284 |

OTHER PUBLICATIONS

SUGITEC; An Astonishing iPad App That Scans Whole Objects; [online]; Jan. 18, 2017; https://www.innovation sugitec.net/32270/, pp. 1-5.

* cited by examiner

APPARATUS, METHOD AND PROGRAM FOR PROCESSING DATA

CROSS-REFERENCE TO RELATED APPLICATIONS

This application is a continuation of U.S. patent application Ser. No. 17/219,426 filed Mar. 31, 2021, which was a continuation of U.S. patent application Ser. No. 16/846,013 filed Apr. 10, 2020, which claims priority under 35 U.S.C. § 119 to Japanese Patent Application No. 2019-091605, which was filed on May 14, 2019, the entire disclosure of which is hereby incorporated by reference.

TECHNICAL FIELD

The present disclosure relates to a data processing apparatus and a technology related thereto, and more particularly to a technology for executing a rendering of a data set detected by a detection apparatus.

BACKGROUND

There is a technology for acquiring a data set (e.g., school-of-fish data) detected by a detection apparatus (e.g., a wave transceiver device) with respect to a target object (e.g., a school of fish), executing a rendering of the data set, and displaying the image generated by the rendering in a display screen. In addition, there is a technology, as disclosed in US2015-0035772A1, for displaying mutually different images based on mutually different data (in detail, a navigation image, a radar image, an underwater detection image) in a plurality of rectangular areas (divided areas) provided in a display screen, respectively, and accepting an instruction for movement (scroll) or a zoom (zoom-in/zoom-out) in the respective rectangular areas by using a touch gesture. In this technology, it is determined which divided area an operated position of the touch gesture belongs to, and based on the determination result, a target area (target image) of the touch gesture is identified. Then, processing, such as a scroll or zoom (a magnification change), is executed in the identified divided area (an area corresponding to the touch gesture).

In the above conventional technologies, the target area of the touch gesture is determined according to which area among the plurality of divided areas (rectangular areas) the operated position of the touch gesture belongs to.

Meanwhile, there is a demand for an improvement in a degree of freedom of the arrangement of the plurality of areas. If the plurality of areas is arranged according to such a demand, a plurality of adjacent rectangular areas may partially be overlapped.

However, when the plurality of rectangular areas are arranged so as to be partially overlapped with each other, it is not always easy to appropriately determine the target area of the touch gesture.

SUMMARY

Therefore, one purpose of the present disclosure is to provide a technology capable of determining a target area of a gesture more appropriately from a plurality of areas.

According to one aspect of the present disclosure, a data processing apparatus is provided, which includes processing circuitry. The processing circuitry is configured to acquire a data set from target detected by a detection apparatus, perform rendering of the data set, and generate a plurality of views arranged on a screen. Each view of the plurality of views comprises a plurality of pixels. Each pixel included in the plurality of views is associated with a plurality of pieces of information including a first information displayed on the screen and a second information that indicates a view among the plurality of views to which the pixel belongs.

According to some example embodiments, the data processing apparatus may further comprise a user interface configured to receive a user operation on the plurality of views. The processing circuitry may be configured to acquire the second information associated with an operation pixel subject to the user operation, specify an operation view subject to the user operation based on the second information of the operation pixel, detect a gesture related to the user operation as an instruction gesture, and modify the operation view based on the instruction gesture, when the instruction gesture is a view modification instruction. The plurality of views may comprise a perspective view. When the operation view is the perspective view, and a displacement amount of the instruction gesture in a horizontal direction in the screen is larger than a displacement amount of the instruction gesture in a vertical direction in the screen, the processing circuitry may be configured to generate a view image as a new perspective view by rotating a viewpoint of the perspective view about a first axis in a three-dimensional space relating to the data set, the first axis being the vertical direction in the screen in the perspective view.

According to another aspect of the present disclosure, a data processing method is provided, which includes acquiring a data set from target detected by a detection apparatus, and performing rendering of the data set, and generating a plurality of views on a screen. Each view of the plurality of views comprises a plurality of pixels. Each pixel included in the plurality of views is associated with a plurality of pieces of information including a first information displayed on the screen and a second information that indicates a view among the plurality of views to which the pixel belongs.

According to still another aspect of the present disclosure, there is provided a non-transitory computer-readable medium having stored thereon computer-executable instructions which, when executed by a computer, cause the computer to acquire a data set from target detected by a detection apparatus, and perform rendering of the data set, and generate a plurality of views on a screen. Each view of the plurality of views comprises a plurality of pixels. Each pixel included in the plurality of views is associated with a plurality of pieces of information including a first information displayed on the screen and a second information that indicates a view among the plurality of views to which the pixel belongs.

According to these configuration, each pixel included in the plurality of views may be associated with the plurality of pieces of information including the second information indicative of the view to which the pixel belongs among the plurality of views. Therefore, it is possible to easily acquire the information related to the view to which the pixel belongs, based on the second information. As a result, it is possible to determine the target area of the gesture more appropriately out of the plurality of areas respectively corresponding to the plurality of views.

BRIEF DESCRIPTION OF DRAWINGS

The present disclosure is illustrated by way of example and not by way of limitation in the figures of the accompanying drawings, in which like reference numerals indicate like elements and in which:

FIG. 22 is a view illustrating the display screen after the perspective view is zoomed-in;

FIG. 23 is a view illustrating the display screen after each view is moved and zoomed-in.

DETAILED DESCRIPTION

Hereinafter, one embodiment of the present disclosure is described with reference to the accompanying drawings.

1. First Embodiment

<1-1. Entire Configuration of Underwater Detection Device>

Figure 1:
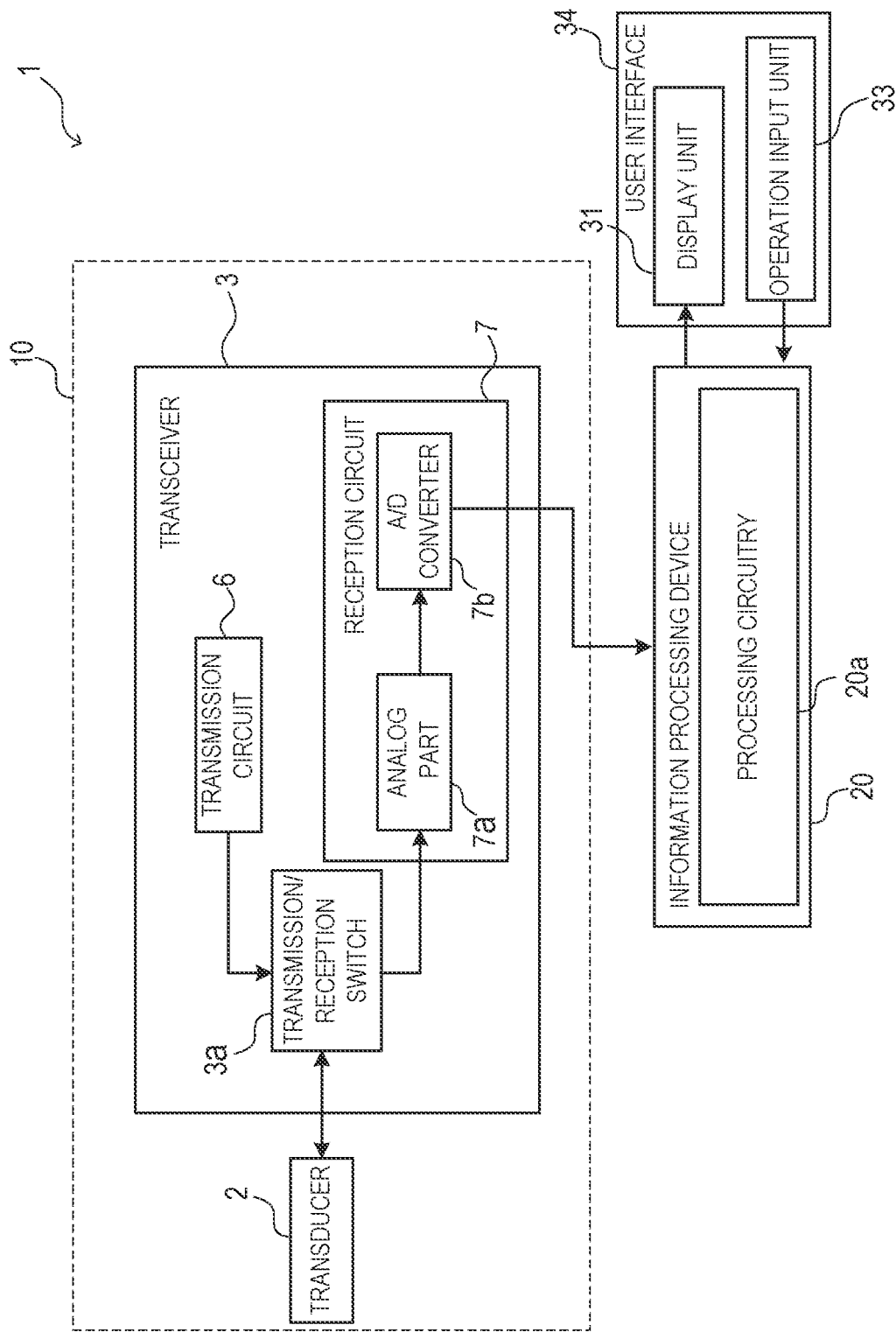
FIG. 1 is a block diagram illustrating a configuration of an underwater detection apparatus (data processing apparatus)

FIG. 1 is a block diagram illustrating a configuration of a data processing apparatus according to the present disclosure (here, an underwater detection apparatus 1). The underwater detection apparatus 1 of this embodiment may be used in a ship (e.g., a fishing boat). Note that the present disclosure may be applied to ships which typically travel on water or sea which are referred to as surface ships, and may also be applied to other types of ships including boats, dinghies, watercrafts, and vessels. Further, the present disclosure may also be applied, if applicable, to submarines.

As illustrated in FIG. 1, the underwater detection apparatus 1 (may also be referred to as an "environmental detection apparatus") may be provided with a scanning sonar 10 and an information processing device 20. In the underwater detection apparatus 1, for example, an information processing device 20 may externally be attached to the scanning sonar 10 which is generally known. Note that, in the underwater detection apparatus 1, the information processing device 20 may be mounted on the scanning sonar 10. A display unit 31 constituted as a display device may externally be attached to the information processing device 20. An operation input unit 33 constituted as a pointing device (e.g., a mouse) may externally be attached to the underwater detection apparatus 1. The display unit 31 and the operation input unit 33 may function as a user interface 34.

The scanning sonar 10 may be provided with a transducer 2 and a transceiver 3.

<1-2. Configuration of Transducer>

The transducer 2 may have a function for transmitting and receiving an ultrasonic wave, and may be attached to the bottom of a ship S. For example, the transducer 2 is formed in a substantially spherical shape.

In detail, the transducer 2 may have a substantially spherical-shaped casing, and ultrasonic transducers (not illustrated) as a plurality of wave transceiver elements attached to an outer circumferential surface of the casing. Each ultrasonic transducer may transmit an ultrasonic wave to an underwater transmitting space as a transmission wave, receive a reception wave as a reflection wave including a reflection of the transmission wave on an underwater target object, convert the reception wave into an electric signal to generate a reception signal from the received reception wave, and output it to the transceiver 3. That is, the transducer 2 may be constituted as a transmitter which transmits the transmission wave underwater (may also be referred to as a "transmission transducer"), and also constituted as a receiver which receives the reception wave including the reflection of the transmission wave on the underwater target object and generates the reception signal from the received reception wave (may also be referred to as a "reception transducer"). The underwater target on which the transmission wave transmitted from the transducer 2 is reflected may include a school of fish.

Note that, in this embodiment, although the spherical-shaped transducer 2 is illustrated, it is not limited to the spherical shape in particular and may be other shapes, such as a substantially cylindrical shape. If the transducer 2 has the substantially cylindrical shape, the transducer 2 may be arranged so that the axial direction is oriented in the vertical direction and the radial direction is oriented in the horizontal direction.

Figure 3:
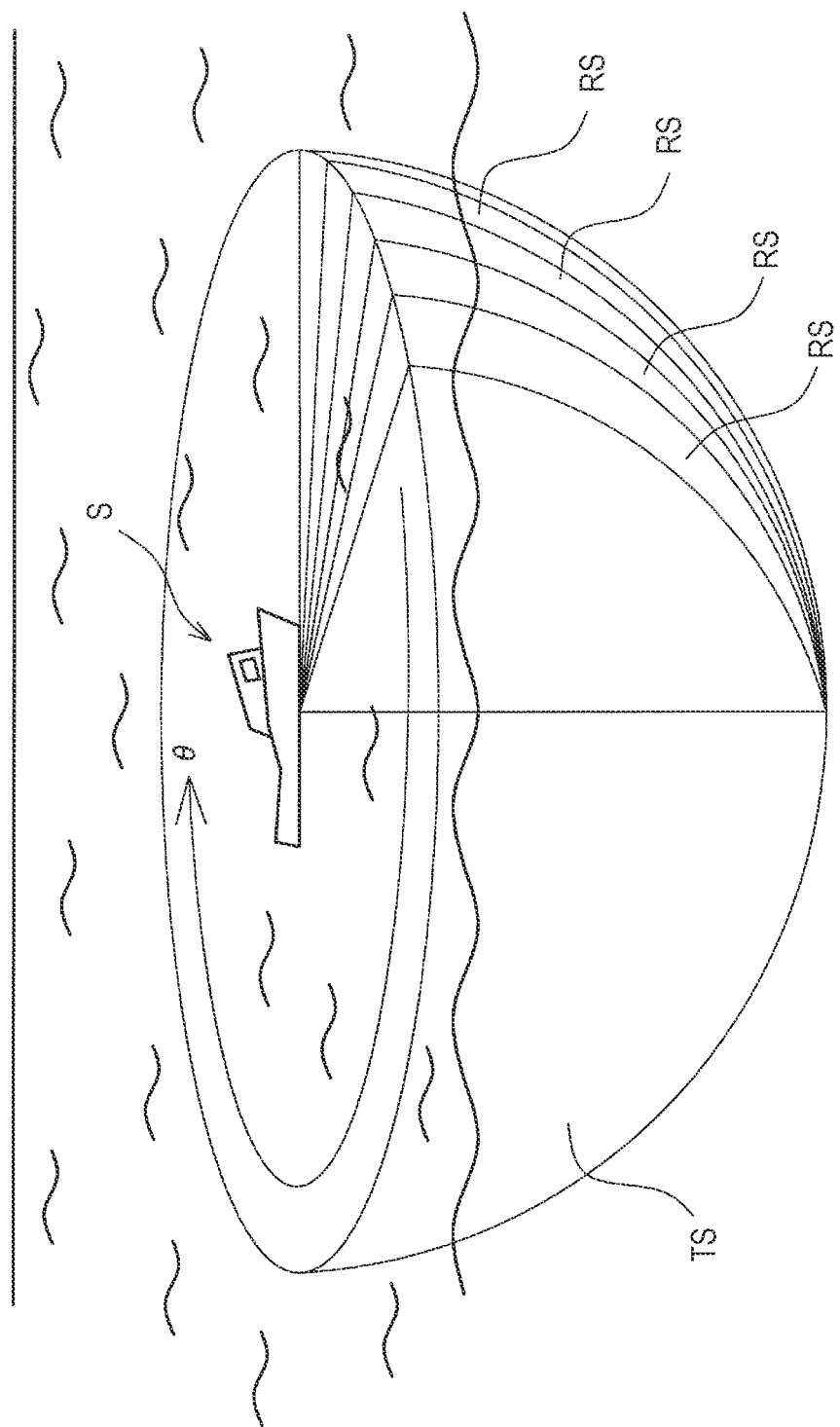
FIG. 3 is a view schematically illustrating a transmitting space where transmission waves are transmitted by a transducer, and a plurality of receiving spaces where respective reception waves are received by the transducer, respectively.

FIG. 3 is a view schematically illustrating a transmitting space TS where transmission waves are transmitted by the transducer 2, and a plurality of receiving spaces RS where reception waves are received by the transducer 2, respectively. The transmission waves transmitted from the transducer 2 mounted on the ship S may be transmitted all at once toward all the underwater azimuth directions centering on the ship S from the transducer 2, for example, to form a hemispherical transmission beam. If the hemispherical transmission beam is formed, the transmitting space TS where the transmission waves are transmitted may be constituted as a hemispherical space. Note that the shape of the transmission beam is not limited to the hemispherical shape, but may be various different shapes depending on the shape of the transducer 2, or the amplitude and phase of an electric signal which is inputted into each wave transceiver element of the transducer 2.

The transducer 2 may receive a reception wave from a three-dimensional space which spreads outside from the transducer 2. In detail, after the transmission of the transmission beam, the transducer 2 may form a plurality of receiving beams for scanning inside the transmitting space TS in the circumferential direction (in the azimuth direction θ illustrated by an arrow in FIG. 3) all at once. That is, all the receiving beams may be formed at the single receiving timing of the transducer 2. Then, the reception wave reflected on the target object (e.g., an underwater school of fish) may be received by each of the plurality of receiving spaces RS (i.e., each space where the receiving beam is formed) arranged in the circumferential direction (i.e., in the azimuth direction θ) of the transmitting space TS.

<1-3. Configuration of Transceiver>

The transceiver 3 may include a transmission/reception switch 3*a*, a transmission circuit 6, and a reception circuit 7 (see FIG. 1).

The transmission/reception switch 3*a* is to switch transmission and reception of a signal to the transducer 2. In detail, when transmitting to the transducer 2 a drive signal for driving the transducer 2, the transmission/reception switch 3*a* may output to the transducer 2 the drive signal outputted from the transmission circuit 6. On the other hand, when the reception signal is received from the transducer 2, the transmission/reception switch 3*a* may output the reception signal received from the transducer 2 to the reception circuit 7.

The transmission circuit 6 may generate the drive signal used as the basis of the transmission wave to be transmitted from the transducer 2. In more detail, the transmission circuit 6 may have transmission circuits (not illustrated) provided corresponding to the respective ultrasonic transducers, and each transmission circuit may generate the drive signal.

The reception circuit 7 may have an analog part 7*a* and an A/D converter 7*b*. The analog part 7*a* and the A/D converter 7*b* may be a reception circuit provided corresponding to each ultrasonic transducer, and may be provided with a reception circuit (not illustrated) which processes the reception signal generated from the received reception wave. The analog part 7*a* may amplify the reception signal as an electric signal which the transducer 2 generates from the reception wave and outputs, and remove unnecessary frequency components by limiting the frequency band. The A/D converter 7*b* may convert the reception signal amplified by the analog part 7*a* into a reception signal as a digital signal. The reception circuit 7 may output the reception signal converted into the digital signal by the A/D converter 7*b* to the information processing device 20.

<1-4. Configuration of Display Unit>

The display unit 31 may be constituted as a display device. The display unit 31 may display an image according to the image signal outputted from information processing device 20 on a display screen. For example, the display unit 31 may three-dimensionally display an underwater state below the ship S. A plurality of views (view images) 51, 52, and 53 may be displayed on the display screen of the display unit 31 as will be described in detail later (see FIG. 4 etc.). Note that a user of the underwater detection apparatus 1 can guess the underwater state below the ship S (e.g., the existence and the position of a school of fish, ups and downs of the seabed, a structure such as an artificial fish reef) by viewing the display screen.

<1-5. Configuration of Information Processing Device>

Figure 2:
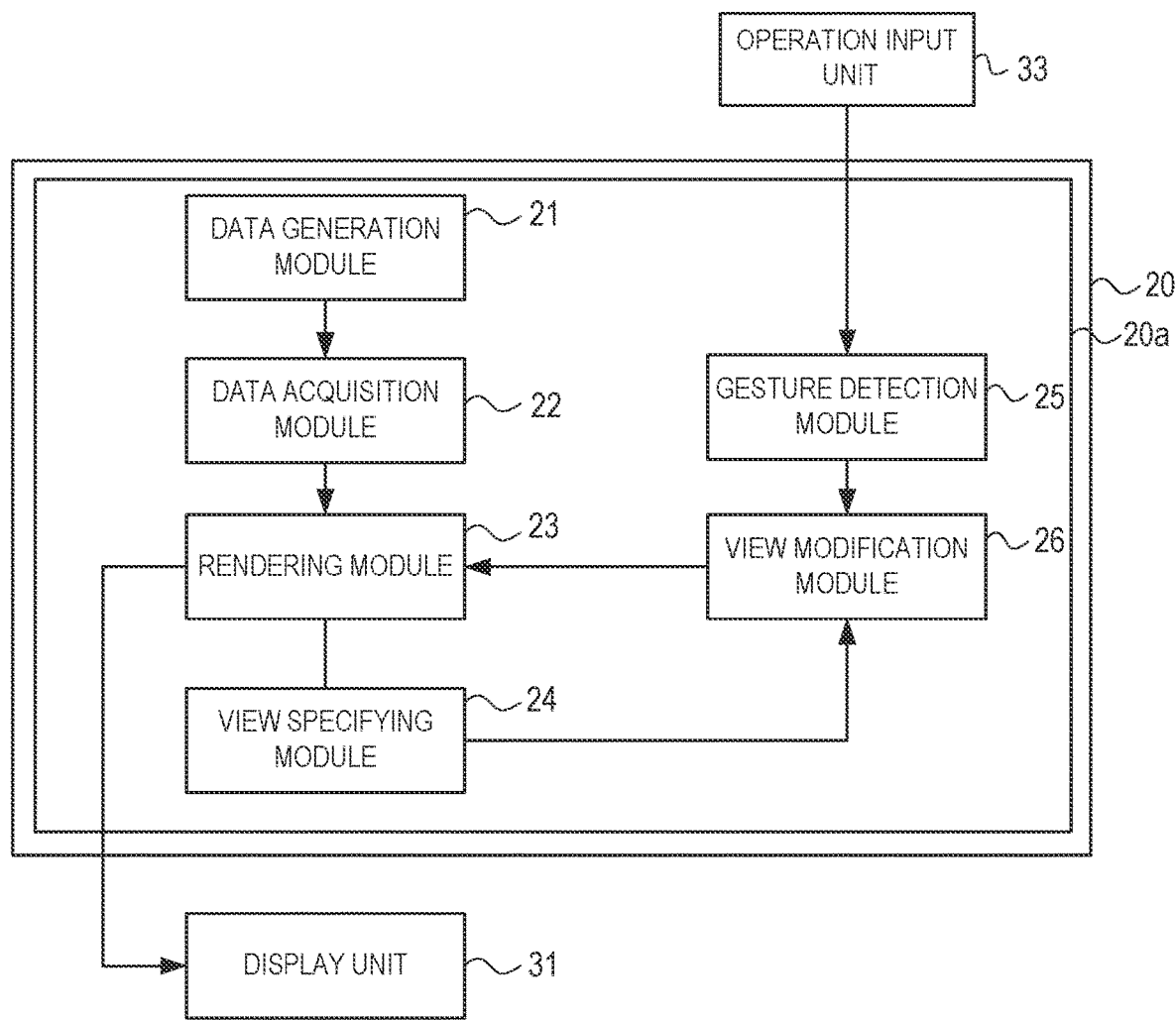
FIG. 2 is a block diagram illustrating a functional configuration of an information processing device.

FIG. 2 is a block diagram illustrating a functional configuration of the information processing device 20. As illustrated in FIGS. 1 and 2, the information processing device 20 may process the reception signal outputted from the reception circuit 7, generate an echo signal of the target object, and generate an echo image signal for displaying an echo of the target object on the display unit 31. Note that, since the information processing device 20 has a rendering function, it may also be referred to as a "rendering device" or a "display control device."

The information processing device 20 may include a data generation module 21, a data acquisition module 22, a rendering module 23, a view specifying module 24, a gesture detection module 25, and a view modification module 26.

The information processing device 20 may be an apparatus connected with the transceiver 3 of the scanning sonar 10 through a cable etc., and comprised of a personal computer (PC), for example. The information processing device 20 may include processing circuitry 20*a* such as a hardware processor (e.g., a CPU (Central Processing Unit), a GPU (Graphics Processing Unit), and an FPGA (Field-Programmable Gate Array)), and various memories (a volatile memory and a nonvolatile memory).

In the hardware processor, various kinds of processors may be implemented by executing a given software program (hereinafter, may simply be referred to as "the program") stored in the nonvolatile memory. Note that the program (in detail, a program module group) may be recorded on a mobile recording medium (e.g., a USB memory), read from the recording medium, and installed in the information processing device 20. Alternatively, the program may be downloaded via a network and installed in the information processing device 20.

By the hardware processor executing the program, various kinds of processing including the data generation module 21, the data acquisition module 22, the rendering module 23, the view specifying module 24, the gesture detection module 25, and the view modification module 26 may be implemented.

The data generation module 21 may be a processing which generates a data set (e.g., echo data) based on the reception signal generated by the transceiver 3. The data generation module 21 may generate the data set by performing a beam forming for each of the plurality of receiving spaces RS based on the reception signal received from the transceiver 3. Note that the data set may be a group of data detected by the detection apparatus for the target object (e.g., a school of fish). For example, the data set may be comprised of data related to an echo intensity (e.g., an intensity of the reflection wave from a school of fish) at each of the three-dimensional positions (X, Y, Z) within an underwater environment. The data set may temporarily be stored in the volatile memory (or the nonvolatile memory).

The data acquisition module 22 may be a processing which acquires the data set (e.g., school-of-fish data) detected by the detection apparatus (e.g., the scanning sonar 10) for the target object (e.g., a school of fish). The data acquisition module 22 acquires, for example, the echo data detected by the transducer 2 and the transceiver 3 for the target object (e.g., a school of fish) and stored in the memory, by extracting the echo data from the memory.

The rendering module 23 may be a processing which performs a rendering of the data set. The rendering module 23 may generate a plurality of views (may also be referred to as view images), which will be described later, arranged in the display screen of the display unit 31.

The view specifying module 24 may be a processing which acquires second information F2 (described later) associated with a target pixel of operation by the user (an operation pixel subject to the user operation), and specifies or identifies an operation target view (an operation view subject to the user operation) based on the second information F2. In other words, the view specifying module 24 may be a processing which identifies a target area of a gesture from a plurality of areas corresponding to the plurality of view images. By using the second information F2, it is possible to easily identify the operation target view.

The gesture detection module 25 may be a processing which detects the gesture accompanying a user operation as an instructing gesture (operational instruction information). The user can perform the operation to arbitrary one of the plurality of views by using the user interface 34. The "gesture" performed by the user may be accepted by the user interface 34 (e.g., the pointing device, such as the mouse).

The "gesture" may be accepted through a mouse operation by the user, for example. In other words, various operations to the mouse (e.g., a click, a drag, and a rotation of a mouse wheel) may be accepted as the "gesture." Note that, without limiting to these gestures, the "gesture" may be accepted by other user interfaces, such as a touch panel (touch screen). For example, a direct touch operation to a screen (e.g., a drag, a pinch-in, and a pinch-out) may be accepted as the "gesture." In this first embodiment, the configuration in which the gesture is accepted using the mouse is mainly described, while the configuration in which the gesture is accepted using the touch panel is mainly described in the second embodiment.

The view modification module 26 may be a processing which collaborates with the rendering module 23 to modify or correct the view(s). When the instructing gesture is a view modification instruction, the view modification module 26 may modify or correct the operation target view (view image to be operated) based on the view modification instruction.

<1-6. Operation>
<Initial Operation>

Figure 5:
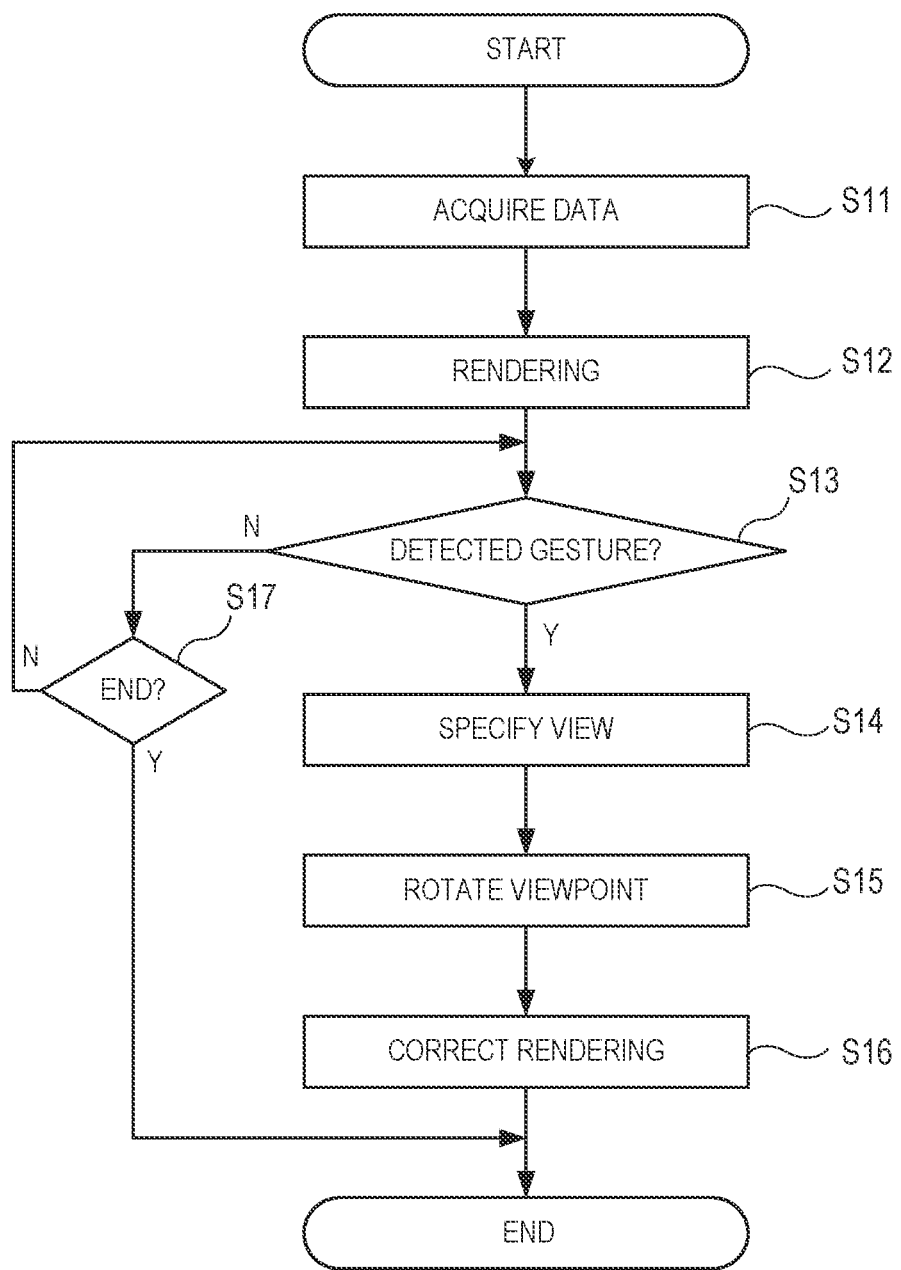
FIG. 5 is a flowchart illustrating operation of the underwater detection apparatus.

FIG. 5 is a flowchart illustrating operation of the underwater detection apparatus 1 (mainly, the information processing device 20). Below, the operation of the underwater detection apparatus 1 is described with reference to FIG. 5 etc.

First, at Step S11, the information processing device 20 (in detail, the data acquisition module 22) of the underwater detection apparatus 1 may acquire the data set detected from the underwater environment related to the underwater target object (e.g., a school of fish). In detail, the echo data detected by the scanning sonar 10 etc. (a data group related to the echo obtained from the hemispherical environmental space which spreads below the ship S) may be acquired as the data set.

Then, at Step S12, the information processing device 20 (in detail, the rendering module 23) may execute a rendering of the data set to generate a plurality of views 50 arranged in a display screen 200 of the display unit 31. Then, the information processing device 20 may arrange the plurality of views at respective initial positions in the display screen 200.

<A Plurality of Views>

Figure 4:
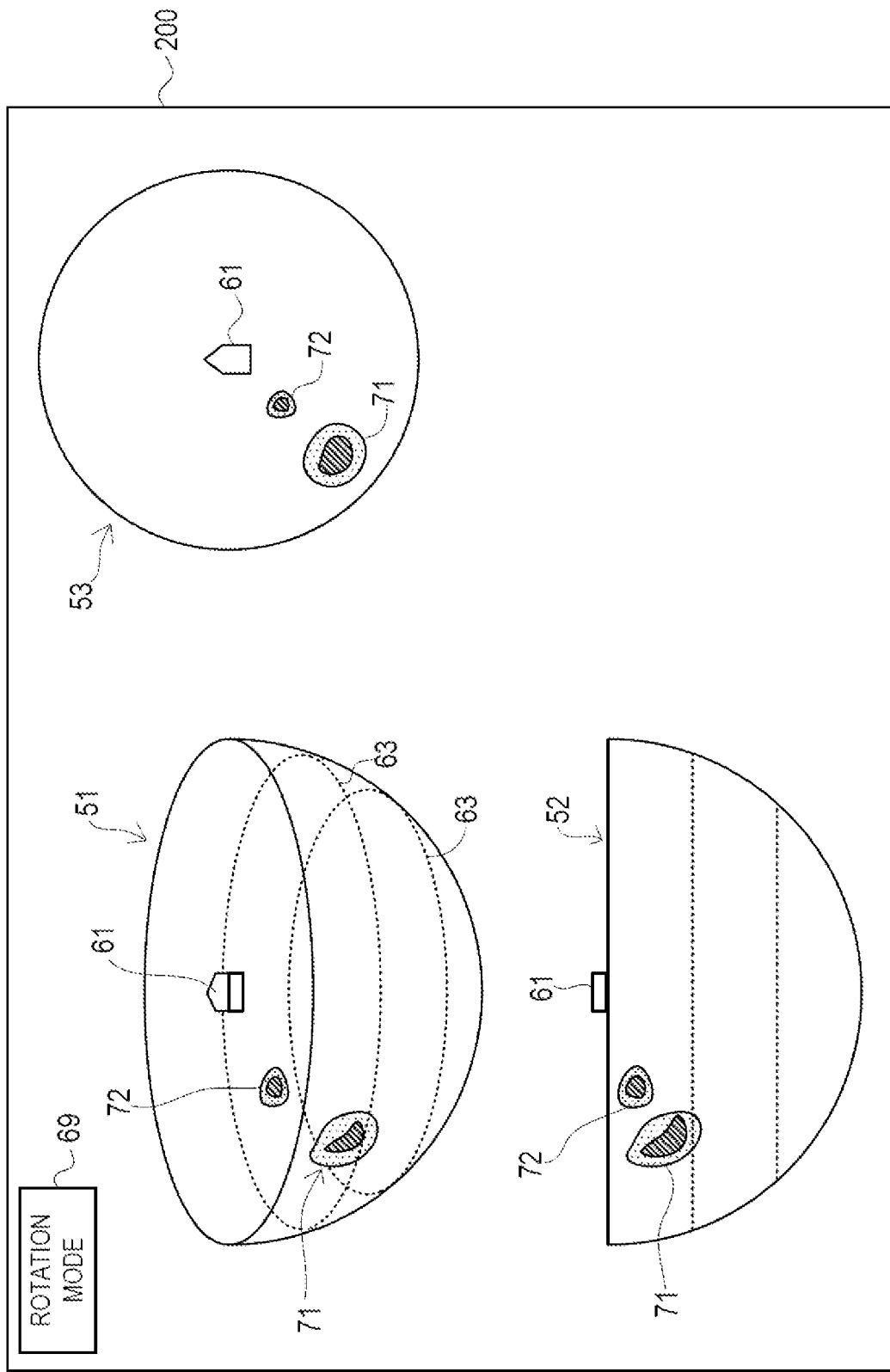
FIG. 4 is a view illustrating a display screen displayed on a display unit.

FIG. 4 is a view illustrating the display screen 200 displayed on the display unit 31. The plurality of views (may also be referred to as "view images") based on the same data set may be displayed on the display screen 200.

As illustrated in FIG. 4, here, the plurality of views 50 may include three views of a perspective view 51, a side view 52, and a top view 53. Note that, without being limited to this configuration, only two views of the perspective view 51, the side view 52, and the top view 53 may be rendered as the plurality of views 50, for example. Alternatively, the plurality of views 50 may include at least two (or at least one) of the perspective view 51, the side view 52, and the top view 53, and other kinds of views. Note that the "perspective view" may also be referred to as a 3D view or a perspective image, the "side view" may also be referred to as a side image, and the "top view" may also be referred to as a plan view, an upper view, a plan image, or an upper image.

Each view may use a hemisphere-shaped (may also be referred to as a "bowl shape" or a "lower hemispherical shape") data set display space as a display target.

The perspective view (3D view) 51 may be a view image in which the data set display space (a three-dimensional space where the data set is displayed) is rendered three-dimensionally by using a perspective projection. Here, the perspective view 51 may have an external shape in where a bowl is seen from obliquely upward (from upper front) in the display screen 200. In detail, the perspective view 51 may have a shape made by a vertical combination of an ellipse in an upper half and another ellipse in a lower half (the two ellipses having long axes (horizontal direction) of the same length and having short axes (vertical direction) of different lengths). By viewing the perspective view (3D view) 51 rendered three-dimensionally, the user can easily grasp the entire image.

Moreover, the side view 52 may be a view image in which the data set display space is seen horizontally from the sideway. Here, the side view 52 may have a semicircular shape (the lower semicircular shape) in the display screen 200.

Moreover, the top view 53 may be a view image in which the data set display space is seen from right above. Here, the top view 53 may have a circular shape in the display screen 200.

<Data Structure>

Figure 24:
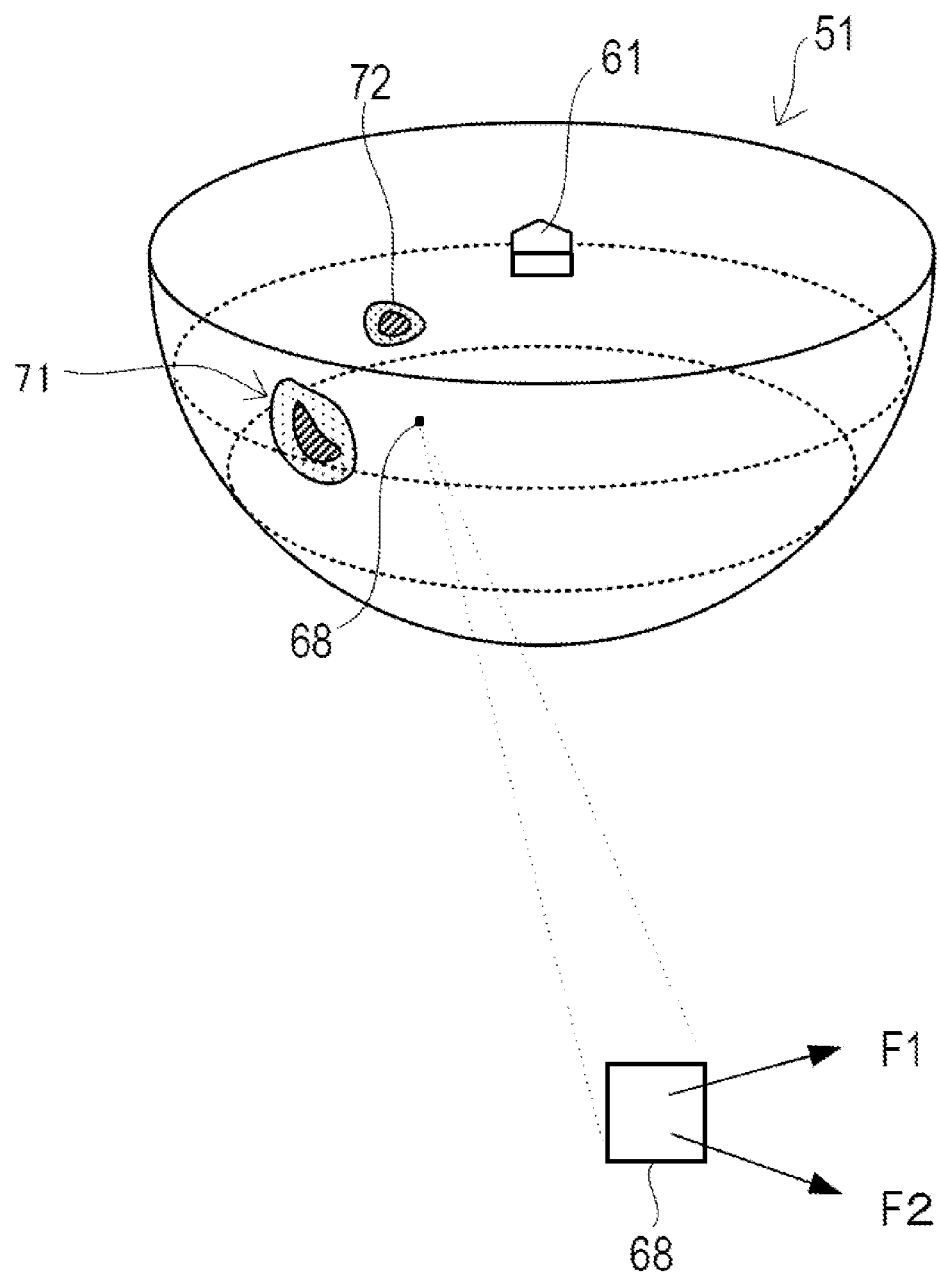
FIG. 24 is a conceptual view illustrating a situation in which a certain pixel in the display screen is associated with first information and second information.

Each of the plurality of views 51, 52, and 53 may include a plurality of pixels. Moreover, as illustrated in a conceptual view of FIG. 24, each pixel 68 included in the plurality of views may be associated with a plurality of pieces of information including first information F1 displayed on the display screen 200 and the second information F2 indicative of a view to which the pixel belongs. FIG. 24 is a view conceptually illustrating a situation where a certain pixel 68 in the display screen 200 (in detail, in the perspective view 51) is associated with a plurality of pieces of information (including the first information F1 and the second information F2). The first information F1 and the second information F2 may similarly be associated with each of other pixels in the display screen 200 (other pixels in the perspective view 51, and each pixel in the side view 52 and the top view 53).

As described above, the data set may be comprised of data related to an echo intensity (an intensity of the reflection wave from a school of fish etc.) at each of a plurality of three-dimensional positions (X, Y, Z) within the underwater environment. In other words, the data set may include the three-dimensional position (X, Y, Z) of each target object and the signal strength of the reception signal from the target object at this three-dimensional position.

In each of the views 51, 52, and 53, the information including the echo intensity at each of the three-dimensional position may be displayed so as to be distinguishable by color. In detail, color information (information for classifying the echo intensity by a plurality of stages and distinguishing the plurality of stages by color), such as red, yellow, and blue may be given to each pixel which is obtained by converting the three-dimensional position (X, Y, Z) into two dimensions. For example, echo information (e.g., the color information according to the echo intensity) which is located at the three-dimensional position where the echo intensity is above a given value on a given line of sight corresponding to each pixel of a certain view, and at the closest three-dimensional position when seen from a given viewpoint of the view may be given as the first information F1 on the pixel in the display screen 200 (two-dimensional plane). Alternatively, echo information which is located at the three-dimensional position where the echo intensity is at the highest level on the given line of sight corresponding to each pixel of one view and at the closest three-dimensional position when seen from the given viewpoint of the view may be given as the first information F1 on the pixel in the display screen (two-dimensional plane).

In each of the views 51, 52, and 53 of the display screen 200 of FIG. 4, a red pixel group (a pixel group indicating that it has the largest signal strength level) of the pixel groups indicative of the echo data of schools of fish 71 and 72 is obliquely hatched. Moreover, a yellow pixel group (a pixel group indicating that it has the second largest signal strength level) is dot-hatched.

Thus, the first information F1 may be associated to each pixel in one view. Note that the first information F1 may be color information based on the echo intensity, or may be a stage value or an echo intensity value (detection value) of the echo intensity.

Moreover, the second information F2 may be also associated with each pixel in one view. The second information F2 on each pixel may be information indicative of a view among the plurality of views 50 (51, 52, and 53) to which the pixel belongs. The second information F2 on each pixel may be also referred to as view identification information, which is information indicative of the view among the plurality of views 51, 52, and 53 to which the pixel belongs.

For example, each pixel in the perspective view 51 may be associated with the information indicating that the pixel belongs to the perspective view 51, as the second information F2. Similarly, each pixel in the side view 52 may be associated with the information indicating that the pixel belongs to the side view 52, as the second information F2. Similarly, each pixel in the top view 53 may be associated with the information indicating that the pixel belongs to the top view 53, as the second information F2.

Note that, here, pixels in the display screen 200 which belong to none of the plurality of views 51, 52, and 53 may not be associated with the second information F2. However, without being limited to this configuration, the pixels in the display screen 200 which belong to none of the views, 51, 52, and 53 may be associated with information indicating that it belongs to none of the views 51, 52, and 53 (e.g., "0"), as the second information F2.

Figure 23:
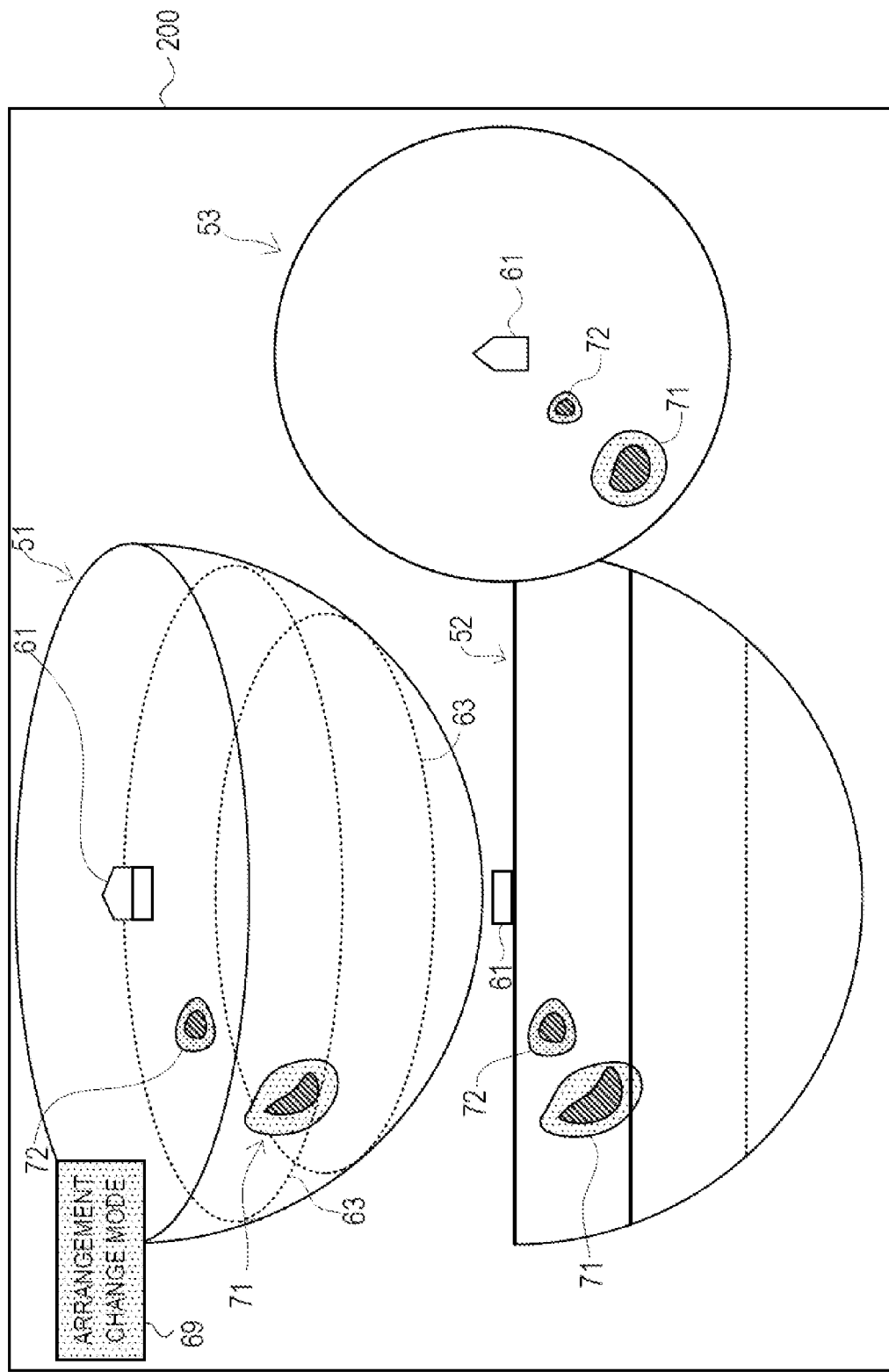

Moreover, when two adjacent views overlap with each other (in appearance), information indicating that each pixel in the overlapped area belongs to an upper (upper layer side) view may be recorded as the second information F2. For example, as illustrated in FIG. 23 (described later), information indicating that each pixel of the overlapped part of the side view 52 and the top view 53 (an area where a part of the top view 53 near the left end side covers a part of the side view 52 near the upper right end) belongs to the upper-side top view 53 may be recorded as the second information F2 on the pixel.

<Outline of Change in Each View According to User Operation>

At the subsequent Step S13, the information processing device 20 (in detail, the gesture detection module 25) may determine whether the gesture associated with the user operation is detected. Here, a gesture by using the mouse (e.g., a drag of the mouse) may be detected as the gesture.

If the gesture is not detected at Step S13, the information processing device 20 may proceed to Step S17, where it determines whether the processing of FIG. 5 is to be ended. At Step S17, the information processing device 20 may determine whether a condition for suspending the processing of the FIG. 5, such as an arrival of an acquisition timing of the next data set (e.g., the next echo data) is satisfied. If determined that the condition has not yet being satisfied, the information processing device 20 may return to Step S13. On the other hand, if determined that the condition is satisfied, the information processing device 20 may suspend the processing of FIG. 5. Note that, after that, the processing of FIG. 5 may be resumed in response to the arrival of the acquisition timing of the next data set.

On the other hand, if the gesture is detected at Step S13, the information processing device 20 may proceed to Step S14.

At Step S14, in response to the acceptance of the view modification instruction, the operation target view of the gesture may first be identified. In detail, the information processing device 20 (view specifying module 24) may acquire the second information F2 associated with the pixel at an operation starting position of the drag. Then, the information processing device 20 may identify the operation target view based on the acquired second information F2. Further, at Step S15, the instructed content of the instructing gesture to the operation target view (correction instruction content) may be identified, and a viewpoint change (viewpoint rotation) may be executed by the view modification module 26 based on the instructed content. In detail, if determined (by the gesture detection module 25 and the view modification module 26) that the gesture performed by the user (instructing gesture) is the view modification instruction, a changed viewpoint according to the view modification instruction may be determined. Further, at Step S16, a rendering based on the changed viewpoint (a rendering of the object related to the data set) may be executed by the rendering module 23 and the view modification module 26 to correct the operation target view.

<Viewpoint Change in Perspective View 51>

Figure 7:
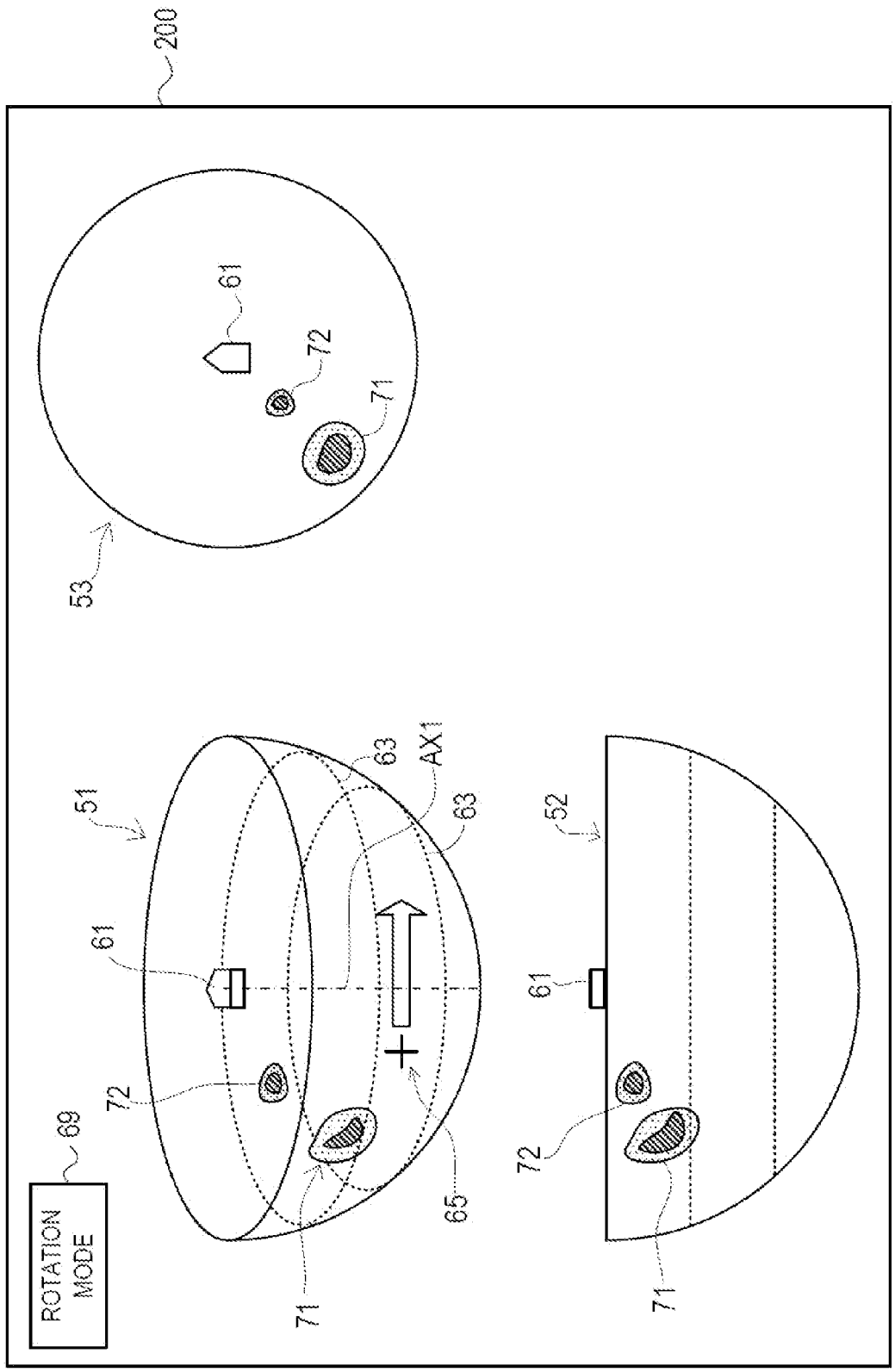
FIG. 7 is a view illustrating a situation in which a rightward drag is performed to a perspective view.
Figure 9:
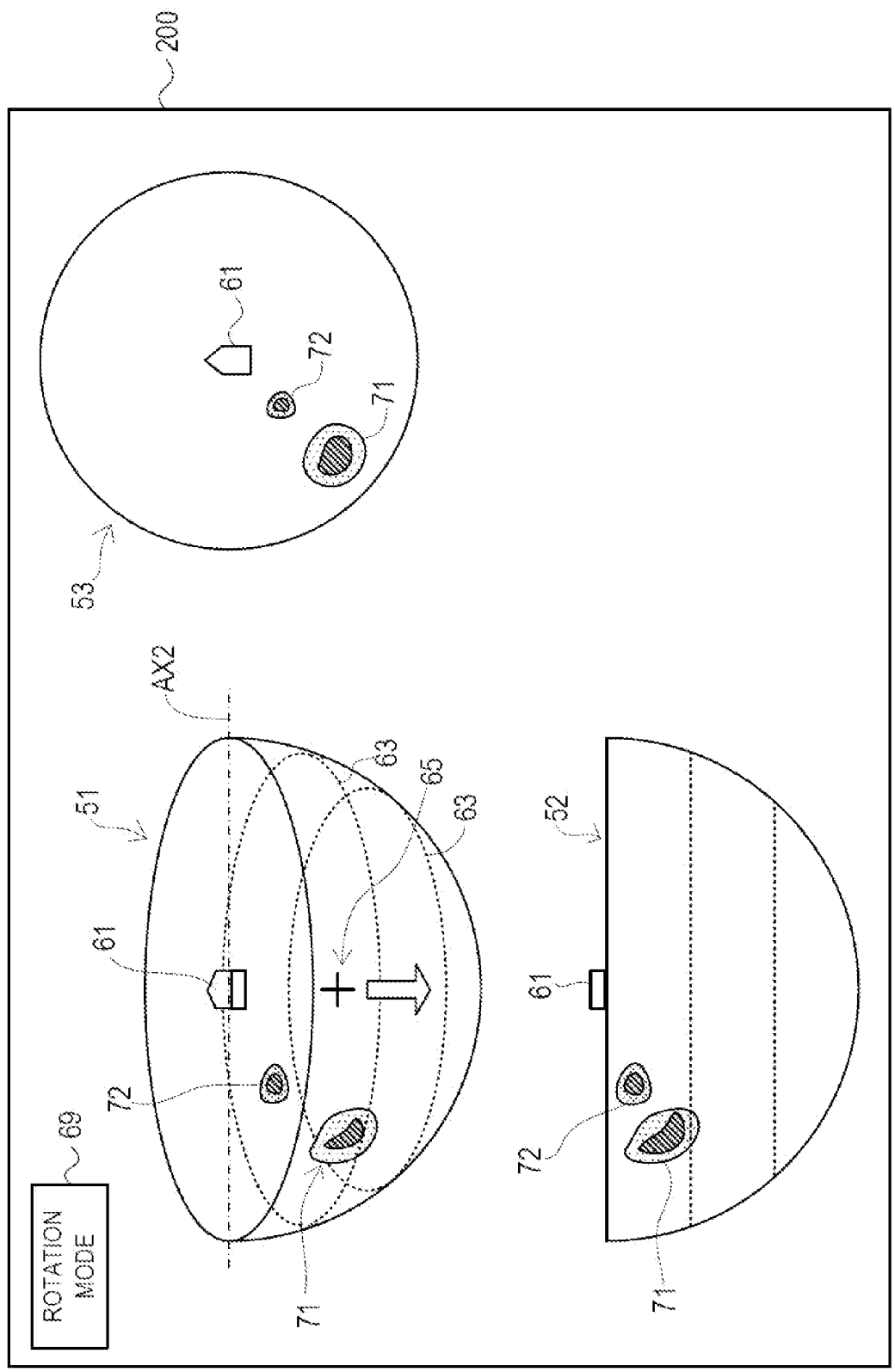
FIG. 9 is a view illustrating a situation in which a downward drag is performed to the perspective view.

The following processing may be executed when the user performs the drag (instructing gesture) of the mouse on the display screen 200 from a state where a mouse cursor 65 exists in the perspective view 51 (see FIGS. 7 and 9).

In this case, first, the information processing device 20 may acquire the second information F2 associated with the pixel at the operation starting position of the drag, and determine that the pixel is associated with the perspective view 51 based on the second information F2. Based on this determination result, the view specifying module 24 may further determine that the operation target view is the perspective view 51 (Step S14).

Next, the information processing device 20 may compare directional component values ΔU and ΔV (see FIG. 6) of the drag (instructing gesture) to identify whether the direction of the given move instruction is either the horizontal direction (U-direction) or the vertical direction (V-direction) in the screen 200 (Step S15). Note that, in FIG. 6, a movement vector of the drag is illustrated by a white arrow, and the horizontal component ΔU (a displacement amount of the mouse in the horizontal direction) and the vertical component ΔV (a displacement amount of the mouse in the vertical direction) of the movement vector (white arrow) are illustrated as well.

Then, the information processing device 20 may identify the instructed content of the instructing gesture according to the comparison result of the instructed displacement amount ΔU in the horizontal direction in the screen 200 and the instructed displacement amount ΔV in the vertical direction in the screen 200 (Step S15). According to this, the main direction of the drag, as a result, the instructed content of the instructing gesture may be identified in cases including a case where the drag is performed in an oblique direction in the screen.

In detail, when the instructed displacement amount ΔU is larger than the instructed displacement amount ΔV, "a rotation instruction about the vertical axis AX1" may be identified as the instructed content of the instructing gesture to the operation target view 51. In other words, a change instruction of the azimuth direction for the viewpoint may be identified as the instructed content. Note that the vertical axis AX1 may be an axis extending in a three-dimensional space (actual space) vertically from the ship S to the seabed.

On the other hand, when the instructed displacement amount ΔU is smaller than the instructed displacement amount ΔV, "a rotation instruction about the horizontal axis AX2" may be identified as the instructed content of the instructing gesture to the operation target view 51. In other words, a change instruction of an angle of elevation for the viewpoint may be identified as the instructed content.

Thus, a rotating direction of the viewpoint may be determined. In detail, the rotating direction of the viewpoint may be changed according to the magnitude correlation between the instructed displacement amount ΔU and the instructed displacement amount ΔV.

Further, at Step S15, the information processing device 20 may determine a rotating amount of the viewpoint (a displacement amount) according to the displacement amount of the drag.

Thus, when the instructed content of the instructing gesture (the rotating direction (the moving direction) and the rotating amount of the viewpoint) are determined, the information processing device 20 may execute a rendering based on the changed viewpoint according to the instructed content to correct the view at the subsequent Step S16. In detail, a new view image may be generated from the changed viewpoint, and the perspective view may be updated based on the new perspective view.

In more detail, if the instructed displacement amount ΔU is larger than the instructed displacement amount ΔV, the information processing device 20 may generate a view image obtained by rotating the viewpoint of the perspective view about the vertical axis (Z-axis) AX1 which is in the three-dimensional space and is associated with the vertical direction in the screen 200 in the perspective view 51, as the new perspective view.

Figure 8:
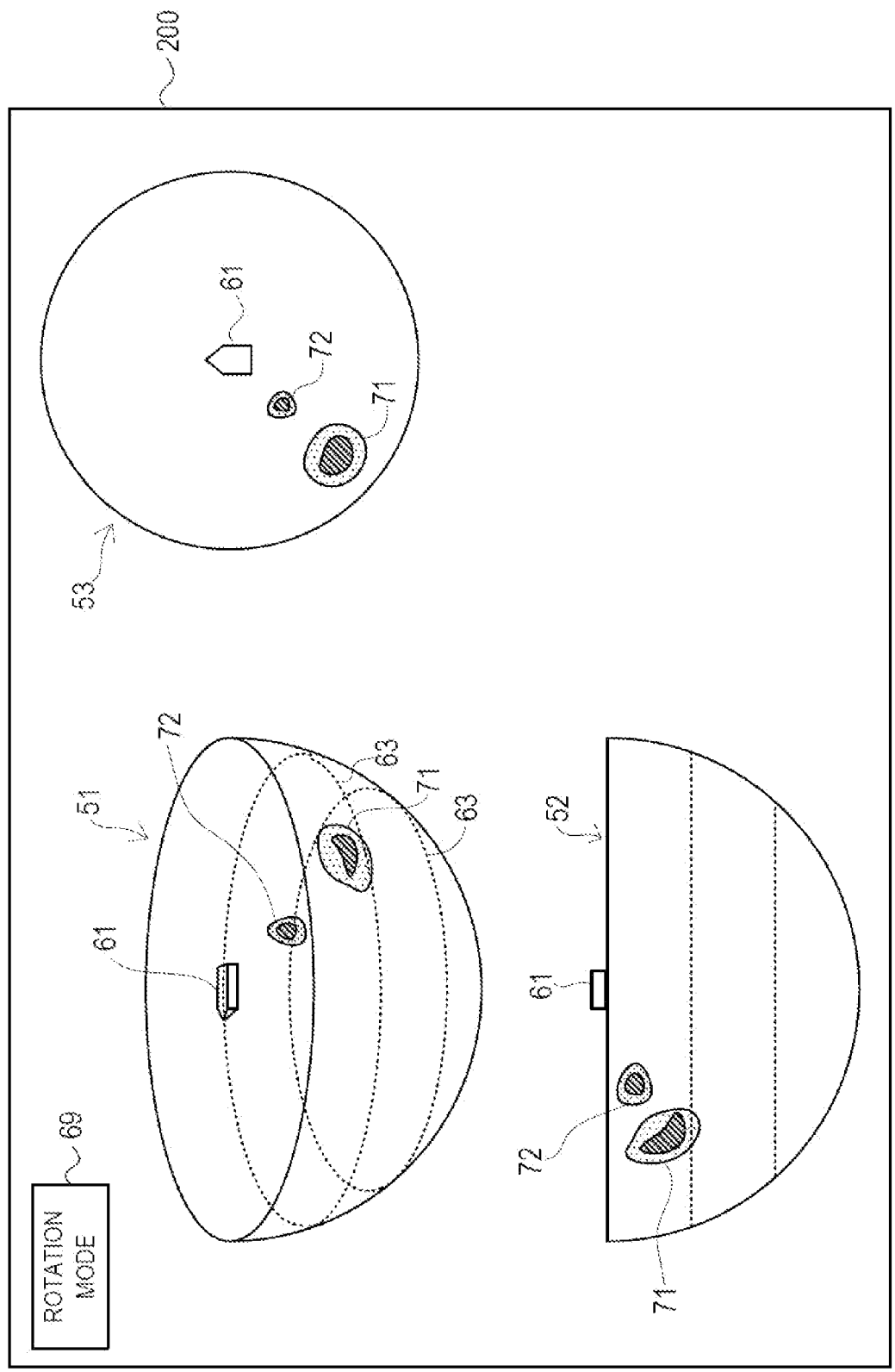
FIG. 8 is a view illustrating a changed perspective view.

For example, as illustrated in FIG. 7, when the user performs a drag (instructing gesture) horizontally to the right (in the display screen 200) from a state where the mouse cursor 65 exists in the perspective view 51, the information processing device 20 may determine that the rotation instruction about the vertical axis (Z-axis) AX1 (and the vertical axis in the screen (V-axis)) in the actual space is given from the user for the perspective view 51. Then, as illustrated in FIG. 8, the perspective view 51 after the change (new perspective view) may be displayed instead of the perspective view 51 before the change. In FIG. 8, the new perspective view where the viewpoint is rotated about the vertical axis AX1 (about 90° clockwise) is illustrated. The new perspective view 51 may be also an image obtained by rotating the original view image about the vertical axis AX1 (about 90° counterclockwise). Note that, when a leftward drag is performed, a perspective view 51 obtained by rotating the original view image about AX1 in the opposite direction may be displayed.

On the other hand, when the instructed displacement amount ΔU is smaller than the instructed displacement amount ΔV, the information processing device 20 may generate a view image obtained by rotating the viewpoint of the perspective view about the horizontal axis AX2 which is in the three-dimensional space and is associated with the horizontal direction in the screen 200 in the perspective view 51, as the new perspective view.

Figure 10:
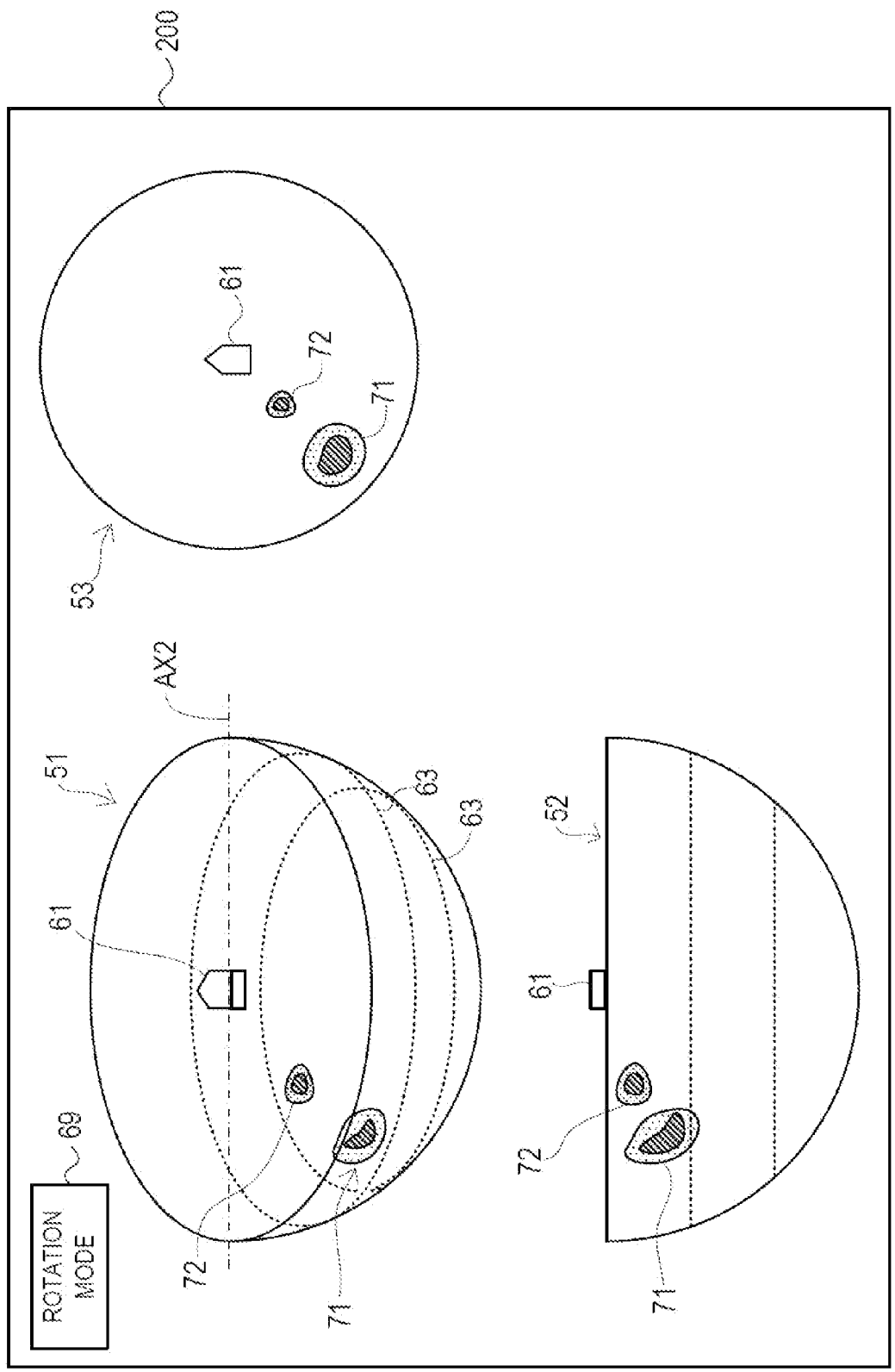
FIG. 10 is a view illustrating a changed perspective view.

For example, as illustrated in FIG. 9, when the user performs a drag vertically downward (in the display screen 200) from the state where the mouse cursor 65 exists in the perspective view 51, the information processing device 20 may determine that the rotation instruction about the horizontal axis (and the horizontal axis in the screen (U-axis)) AX2 in the actual space is given from the user for the perspective view 51. Then, as illustrated in FIG. 10, a perspective view 51 after the change (a new perspective view obtained by rotating the viewpoint about the horizontal axis AX2) may be displayed instead of the perspective view 51 before the change. In FIG. 10, the perspective view from the viewpoint at which the angle of elevation is larger may be displayed, and this may be clear as comparing FIG. 10 with FIG. 9. Note that, when an upward drag is performed, a perspective view 51 obtained by rotating the original perspective view about AX2 in the opposite direction may be displayed.

<Viewpoint Change in Side View 52>

Figure 11:
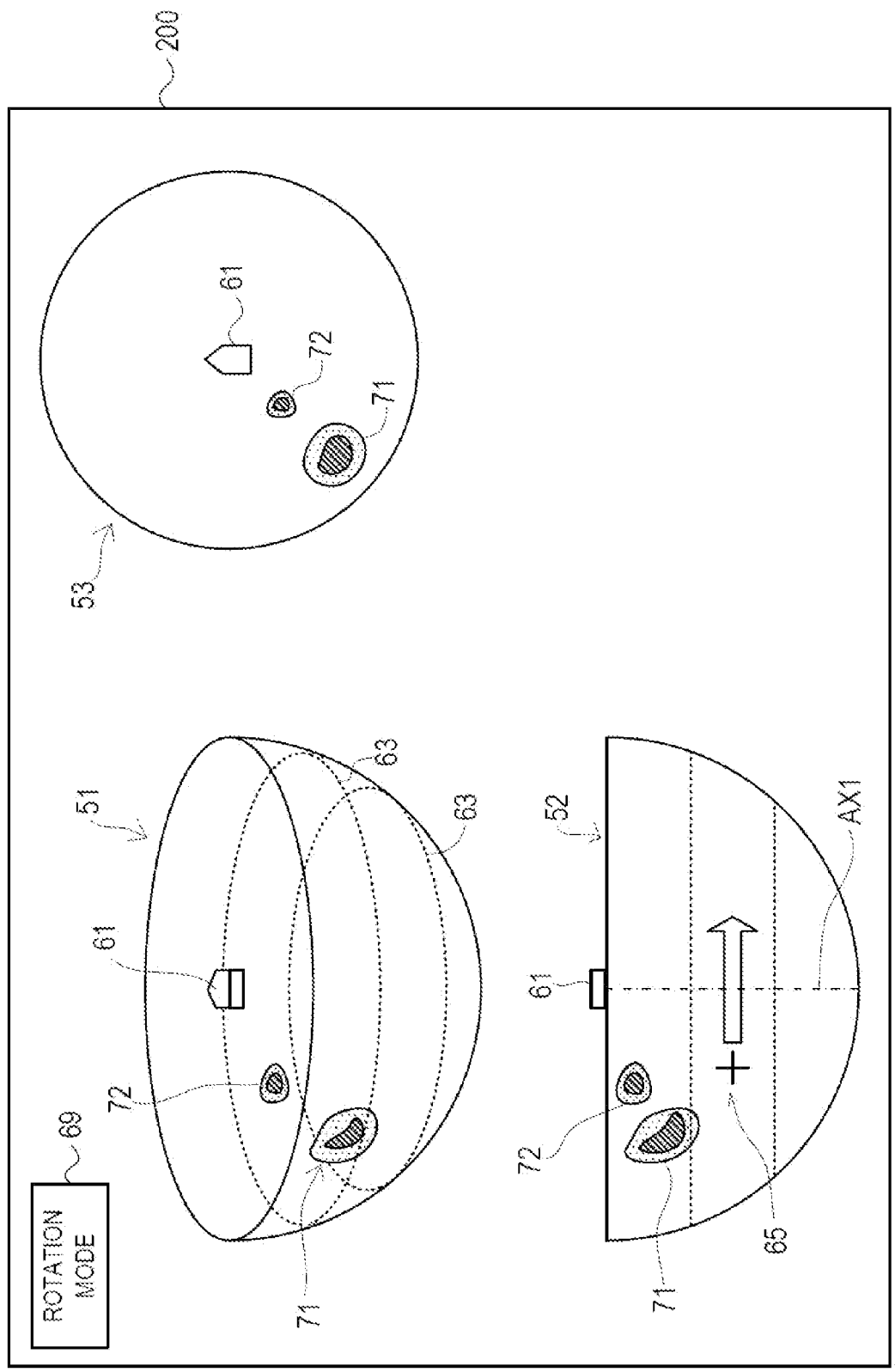
FIG. 11 is a view illustrating a situation in which a rightward drag is performed to a side view.
Figure 13:
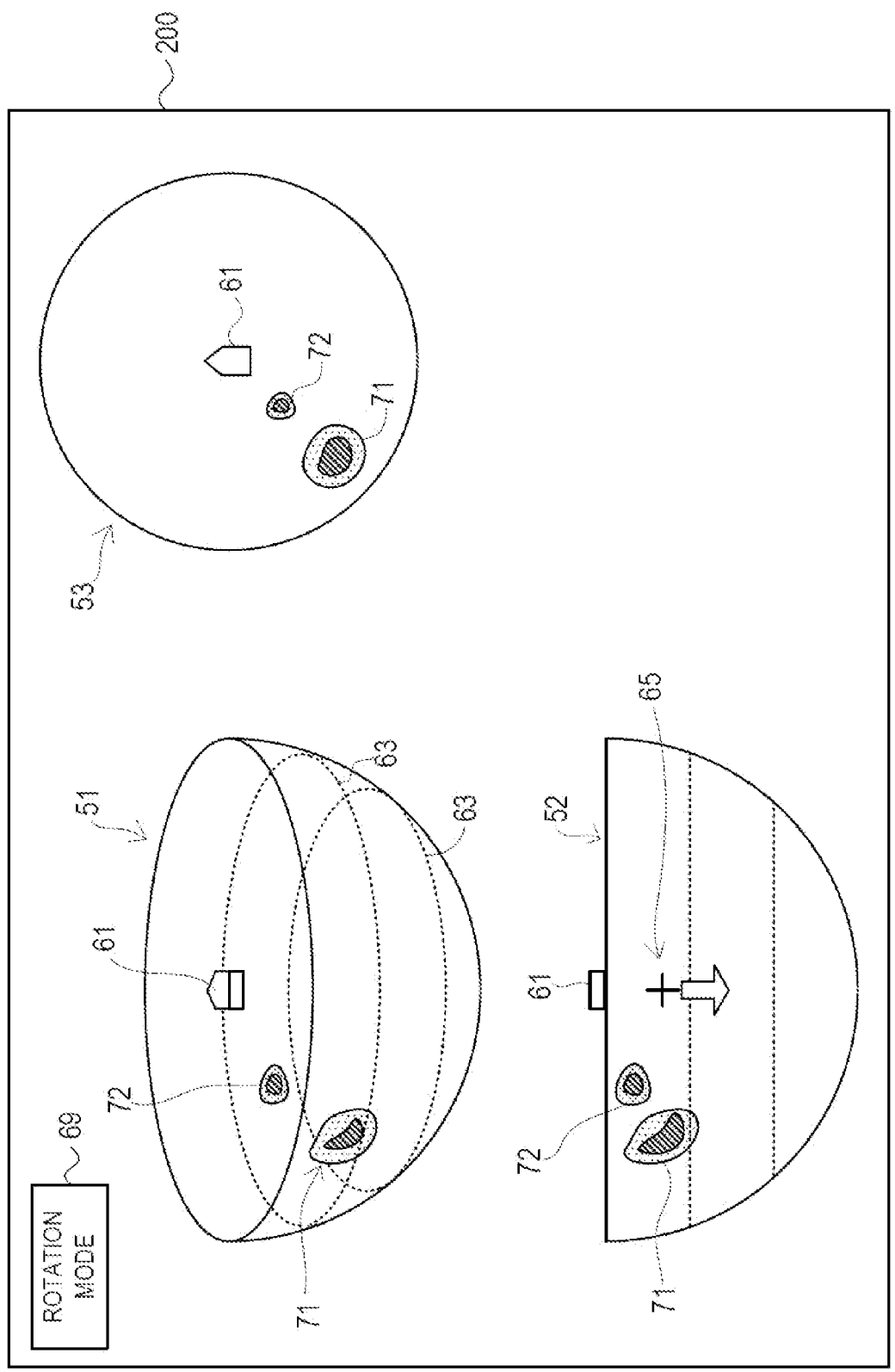
FIG. 13 is a view illustrating a situation in which a downward drag is performed to the side view.

Moreover, as illustrated in FIG. 11 (or FIG. 13), the following processing may be executed when the user performs a drag (a drag of the mouse) from the state where the mouse cursor 65 exists in the side view 52.

In this case, first, it may be determined that the pixel at the operation starting position of the drag is associated with the side view 52 based on the second information F2 on the pixel, and the view specifying module 24 may determine that the operation target view is the side view 52 (Step S14).

Next, the information processing device 20 may identify the instructed content of the instructing gesture according to the comparison result between the instructed displacement amount ΔU and the instructed displacement amount ΔV (see FIG. 6) (Step S15), and correct the view if needed based on the instructed content of the instructing gesture (Step S16). In detail, the necessity etc. of the correction of the view may be changed according to the magnitude correlation between the instructed displacement amount ΔU and the instructed displacement amount ΔV.

In detail, if the instructed displacement amount ΔU is larger than the instructed displacement amount ΔV (see FIG. 11), "the rotation instruction about the vertical axis AX1" may be identified as the instructed content of the instructing gesture to the operation target view 52. Then, the information processing device 20 may generate a view image obtained by rotating the viewpoint of the side view 52 about the vertical axis AX1 as a new side view 52, and the new side view 52 may be displayed in the screen 200 instead of the original side view 52 (see FIG. 12). Note that, when a leftward drag is performed, a side view 52 obtained by rotating the original side view 52 about AX1 in the opposite direction may be displayed.

On the other hand, when the instructed displacement amount ΔU is smaller than the instructed displacement amount ΔV (see FIG. 13), the information processing device 20 may determine that the instructing gesture is not the view modification instruction. In other words, the information processing device 20 may identify that "the viewpoint will not be rotated (changed)" as the instructed content of the instructing gesture to the operation target view 52 (i.e., rotation will be inhibited). In this case, the correction of the side view 52 will not be performed (see FIG. 4).

<Viewpoint Change in Top View 53>

Figure 14:
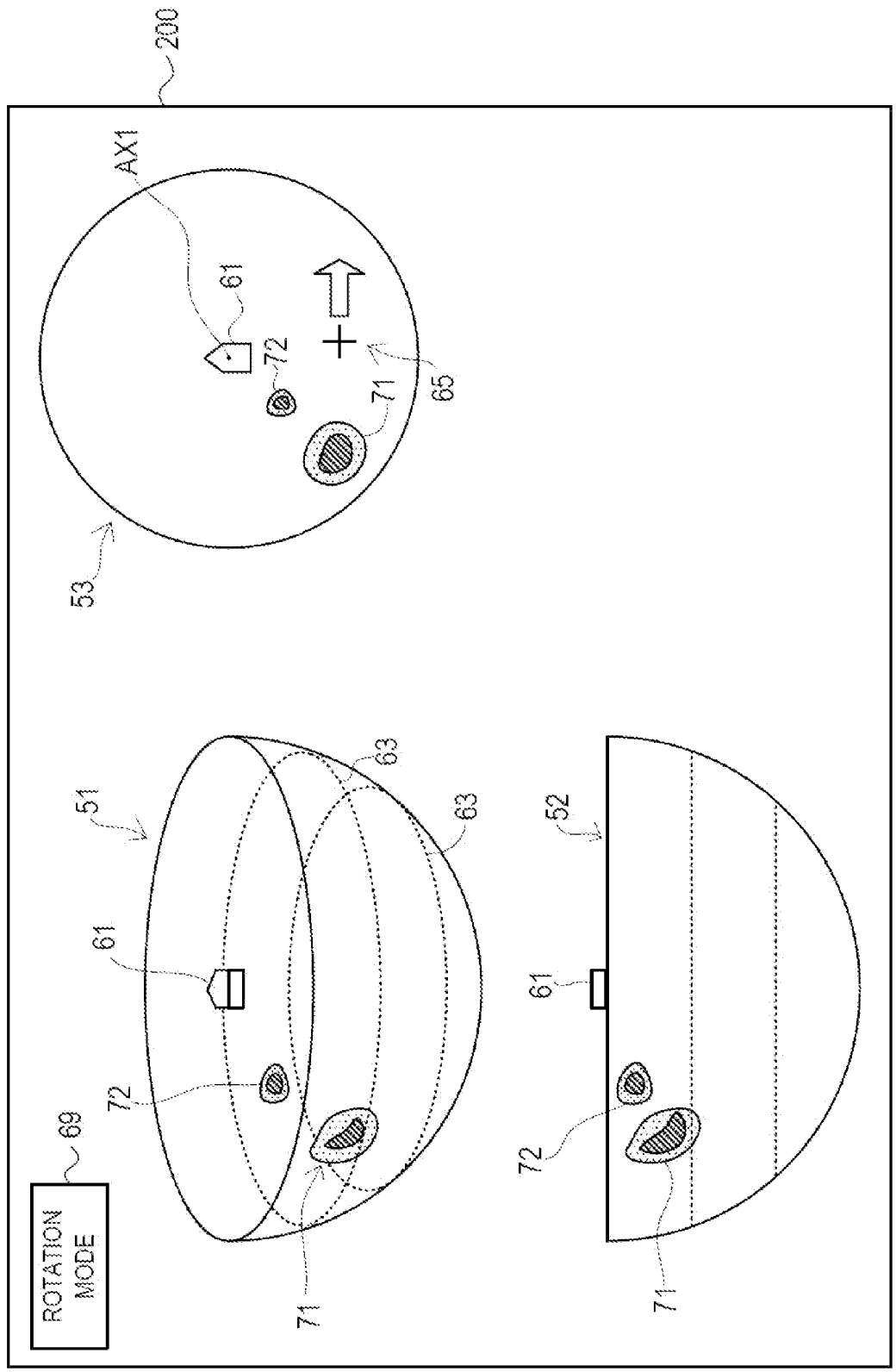
FIG. 14 is a view illustrating a situation in which a drag is performed to a top view.
Figure 15:
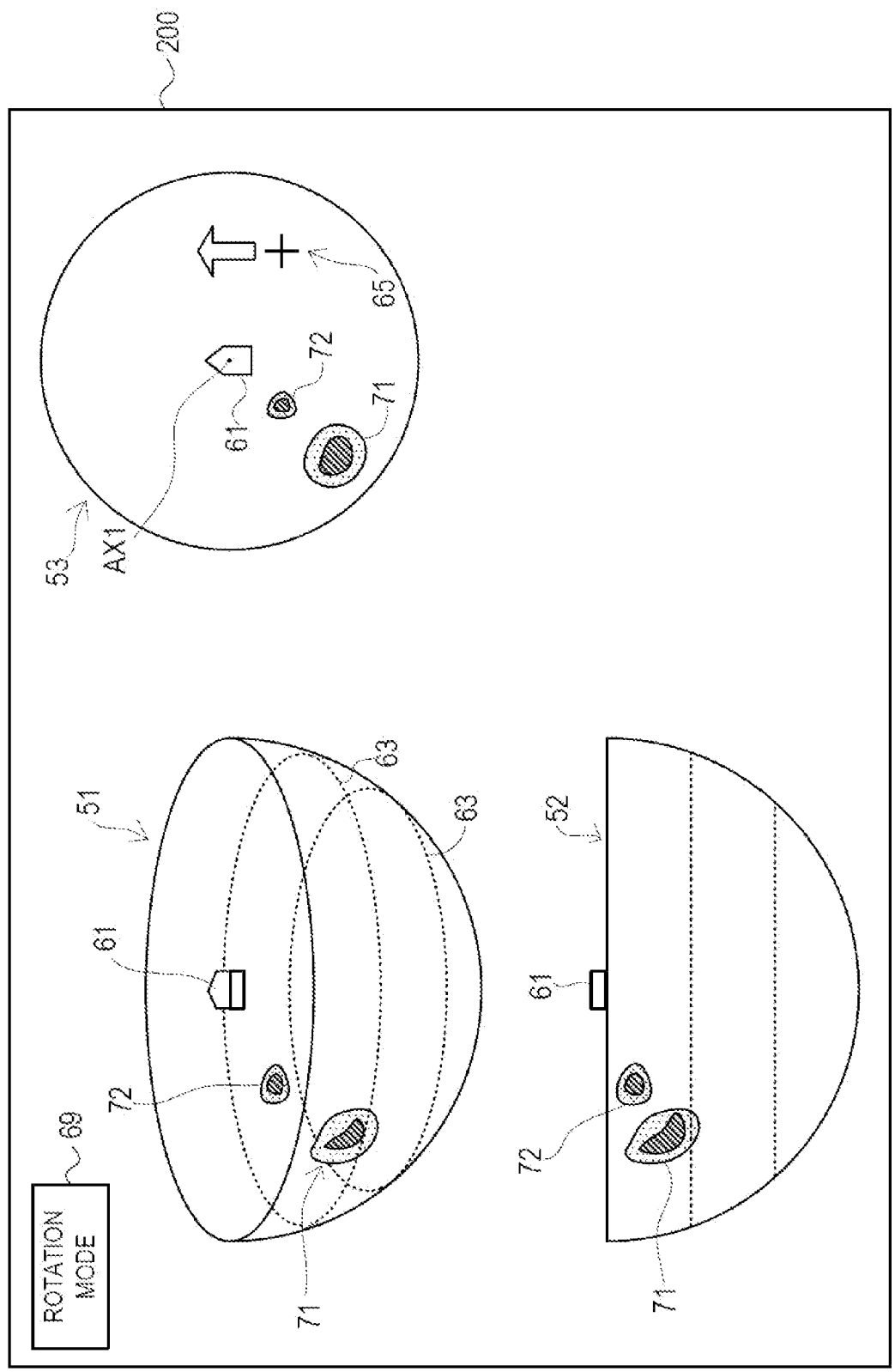
FIG. 15 is a view illustrating a situation in which a drag is performed to the top view.
Figure 16:
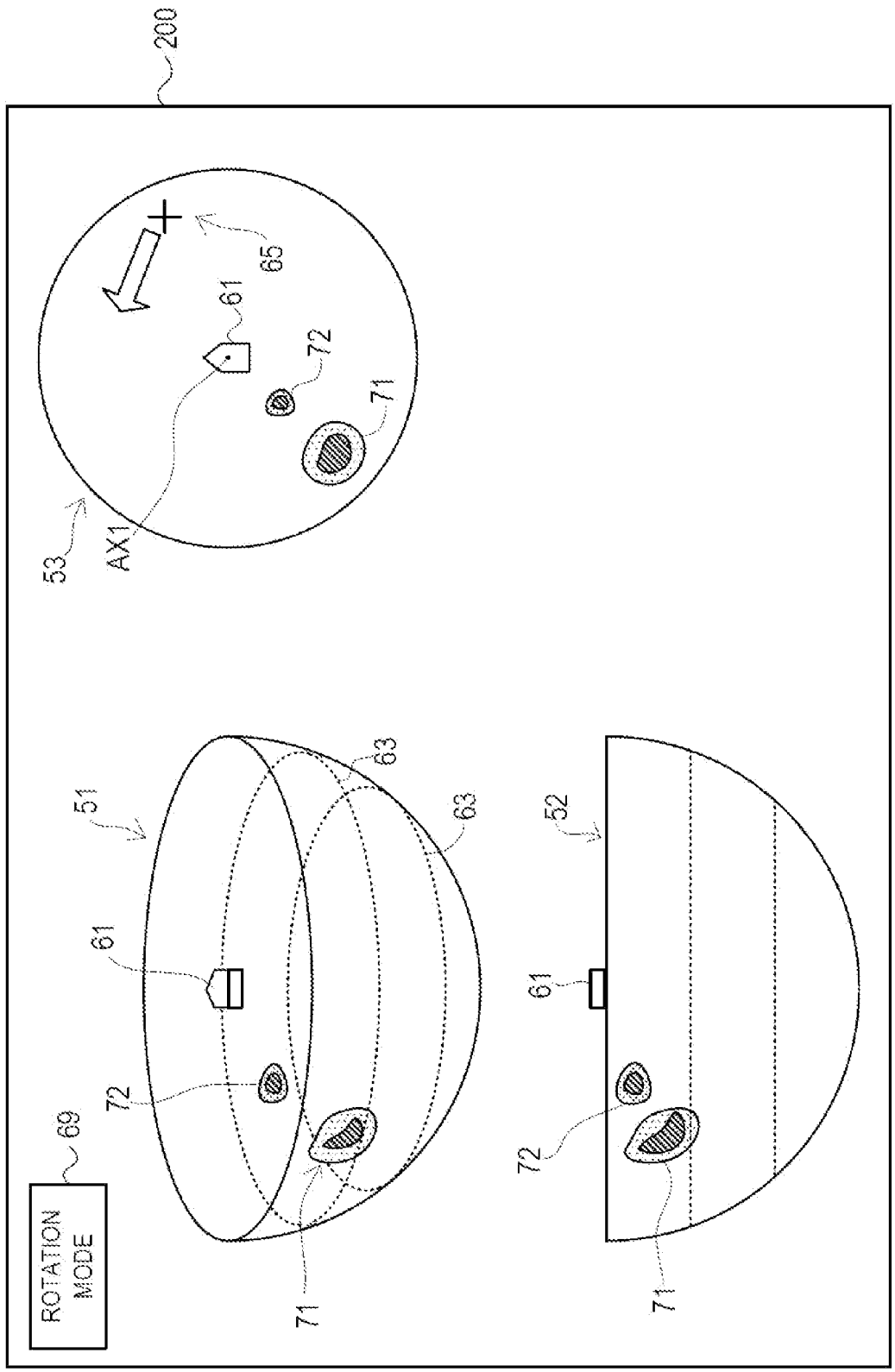
FIG. 16 is a view illustrating a situation in which a drag is performed to the top view.

As illustrated in FIGS. 14 to 16, the following processing may be executed when the user performs a drag (instructing gesture) from the state where the mouse cursor 65 exists in the top view 53. Note that, a rightward drag is performed in FIG. 14, an upward drag is performed in FIG. 15, and an upward and leftward drag is performed in FIG. 16.

In this case, first, the information processing device 20 may determine that the pixel at the operation starting position of the drag is associated with the top view 53 based on the second information F2 of the pixel, and the view specifying module 24 may determine that the operation target view is the top view 53 (Step S14).

Figure 6:
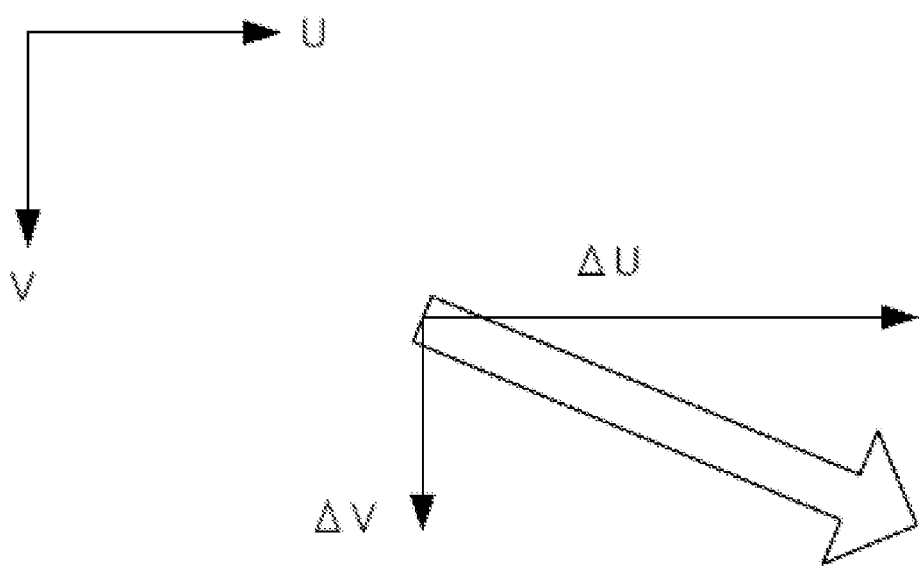
FIG. 6 is a view illustrating a movement vector of a drag.
Figure 17:
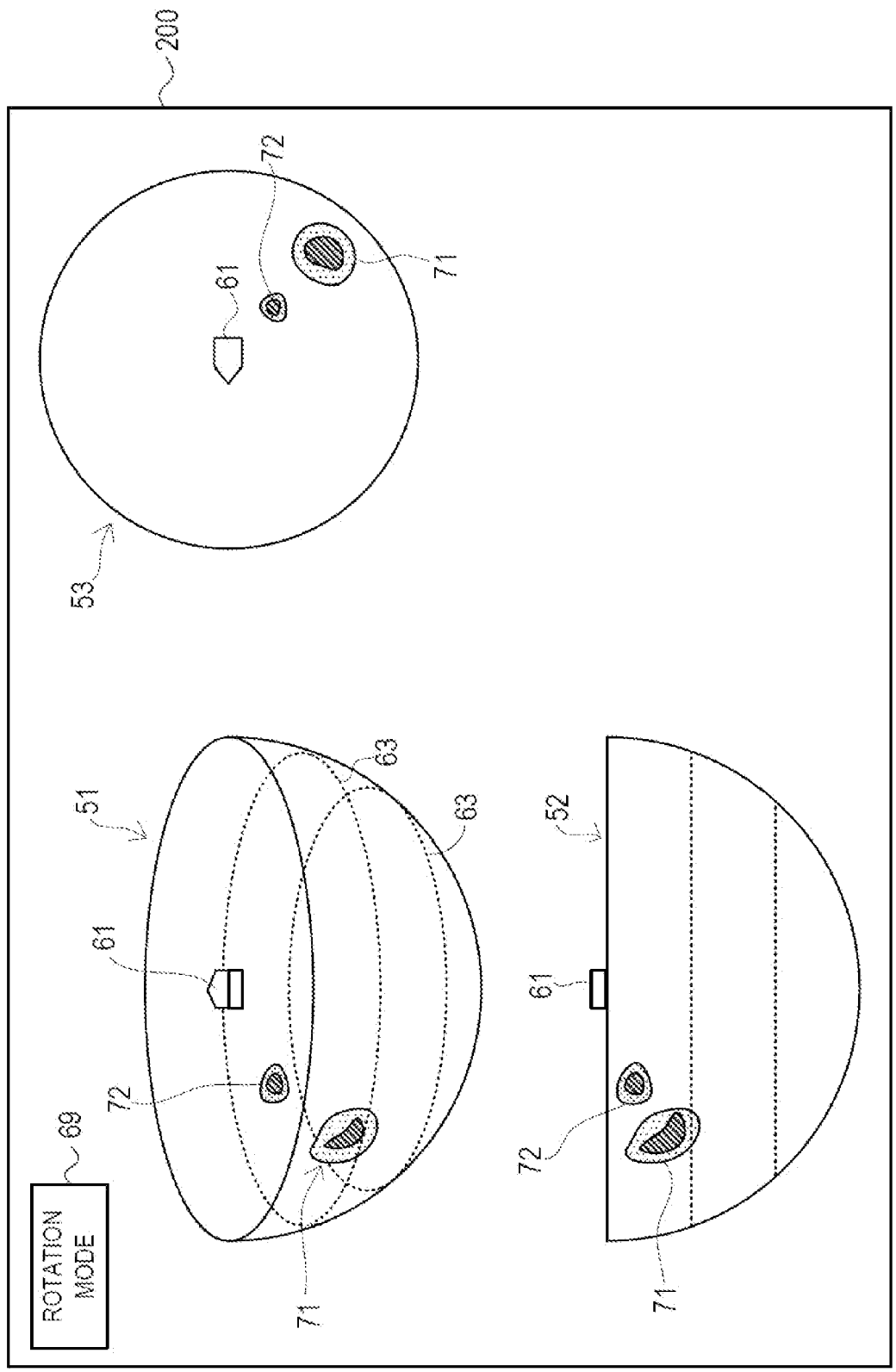
FIG. 17 is a view illustrating a changed top view.

Next, the information processing device 20 may identify the instructed content of the instructing gesture regardless of the magnitude correlation between the instructed displacement amount ΔU and the instructed displacement amount ΔV (see FIG. 6). In detail, the information processing device 20 may identify that the instruction for rotating the viewpoint of the top view 53 about the vertical axis AX1 in the three-dimensional space is given (Step S15). Then, the information processing device 20 may generate a view image obtained by rotating the viewpoint of the top view 53 about the vertical axis AX1 in the three-dimensional space as a new top view based on the instructed content of the instructing gesture (Step S16). Then, the new top view 53 may be displayed in the screen 200 instead of the original top view 53 (see FIG. 17). Note that, in the top view 53, the vertical axis AX1 in the three-dimensional space may extend in the vertical direction with respect to the screen 200 (drawing surface). Note that, when a rotation in the opposite direction about the center axis of the top view 53 is performed, a top view 53 obtained by rotating the original top view about AX1 in the opposite direction may be displayed.

<Exceptional Handlings in Drag>

The above processings are performed when the drag is performed to any of the plurality of views and the drag is started from a point in the view other than given marks (e.g., equi-depth lines).

On the other hand, even if the drag is performed to any of the plurality of views, when the drag is started from the given mark (e.g., the equi-depth line), the following exceptional handlings may be performed.

Figure 19:
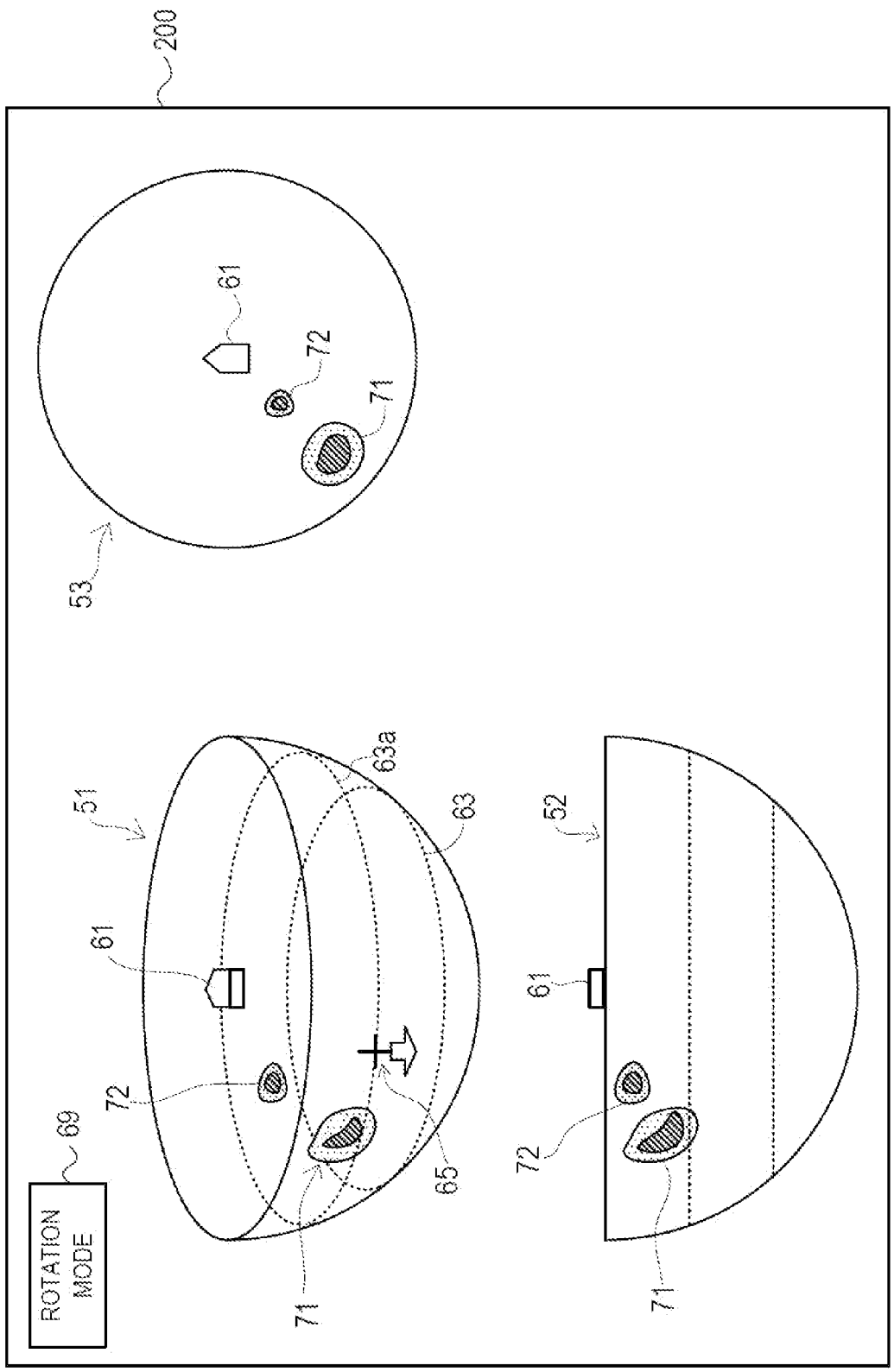
FIG. 19 is a view illustrating a situation in which a depth line is dragged.
Figure 20:
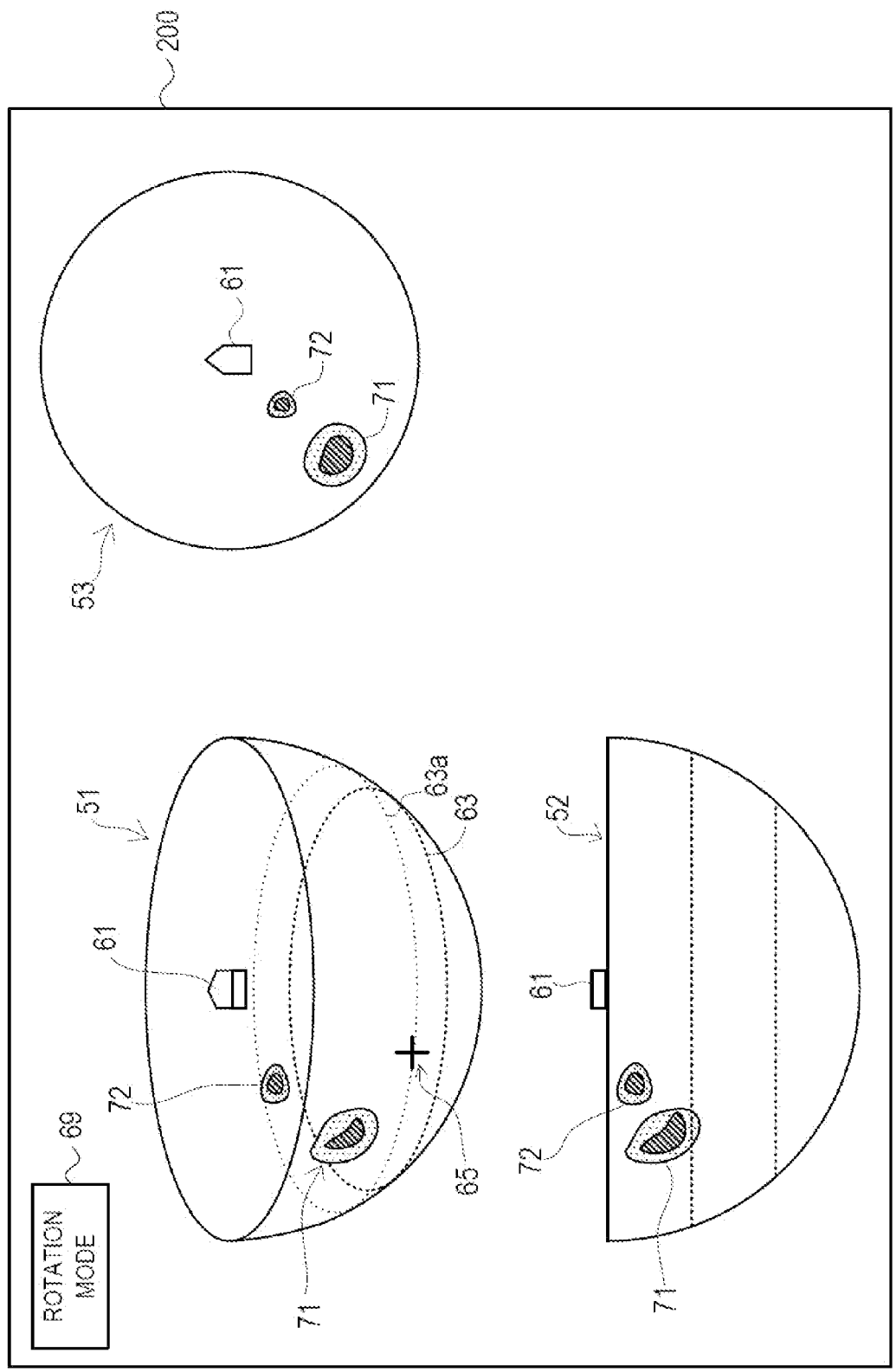
FIG. 20 is a view illustrating a perspective view after the depth line is moved.

For example, as illustrated in FIG. 19, when a vertical drag (e.g., downward) is performed from a position on the equi-depth line (a curve indicating the same water depth) 63 (63*a*) in the perspective view 51, processing for moving the equi-depth line 63 may be performed in the perspective view 51. In FIG. 20, the equi-depth line 63 (63*a*) is moved downwardly in the changed screen 200.

<Move and Zoom>

A mode change button 69 (see FIG. 4 etc.) may be provided to the screen 200. Each time this mode change button 69 is pressed, an operation mode may be changed between a "rotation mode" and an "arrangement change mode." The "rotation mode" may be a mode in which the above operation (the rotation of each of the views 51, 52, and 53) is realized (see FIGS. 4 to 20), and the "arrangement change mode" may be a mode in which an arrangement etc. of each of the views 51, 52, and 53 in the screen 200 is changeable (see FIG. 21 etc.).

The following operation may be performed when the mode change button 69 in the screen 200 is pressed and the operation mode is changed to the "arrangement change mode."

Figure 21:
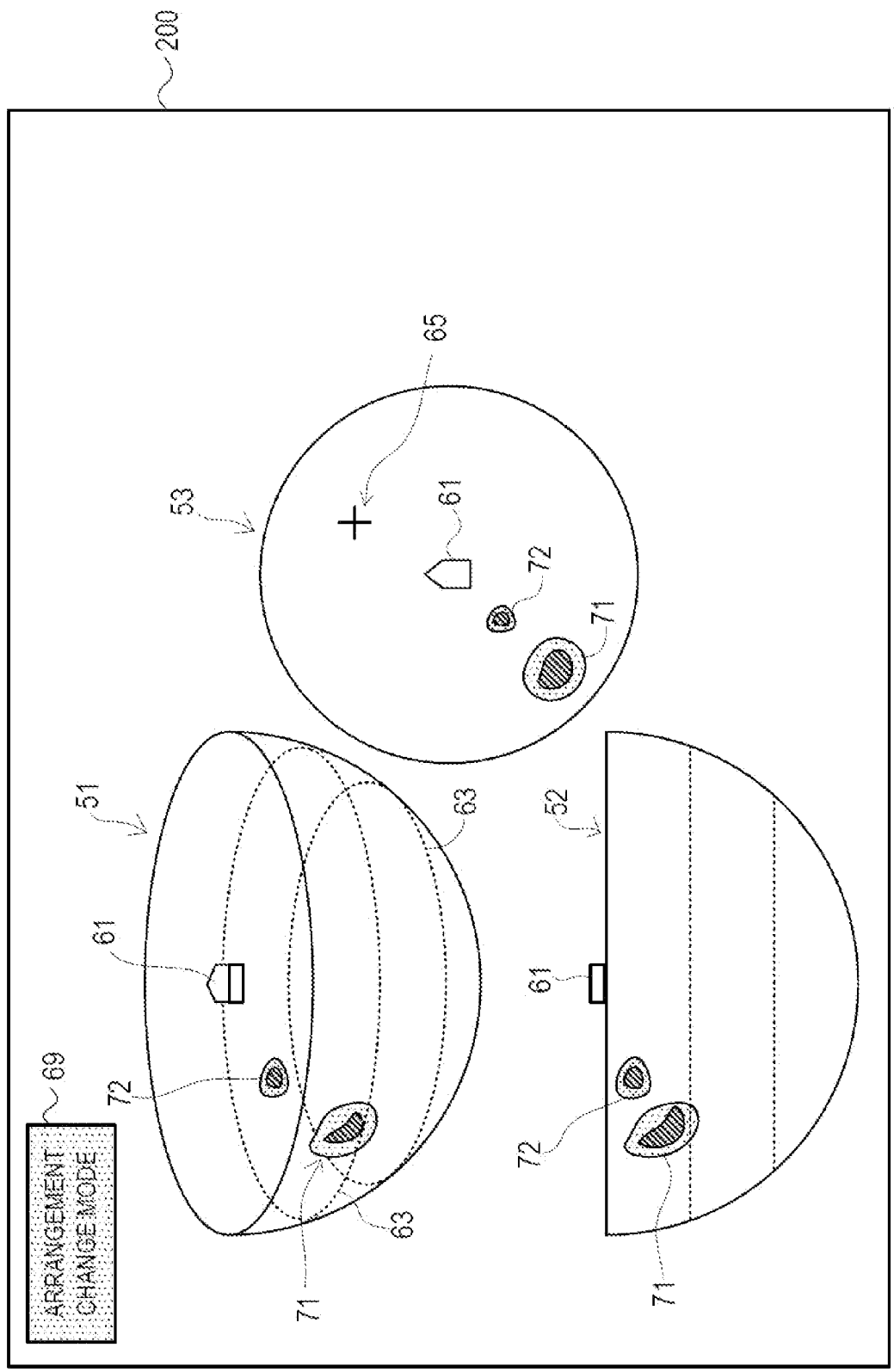
FIG. 21 is a view illustrating the display screen after the top view is moved.

In detail, according to the drag to the operation target view, the position of the operation target view in the screen 200 may be changed. For example, as illustrated in FIG. 21, according to a downward and leftward drag to the top view 53, the position of the top view 53 in the screen 200 may be changed to a downward and leftward position. In FIG. 21, the top view 53 may be moved to a position near the perspective view 51 and downward and rightward of the perspective view 51, and a position near the side view 52 and upward and rightward of the side view 52.

Figure 22:
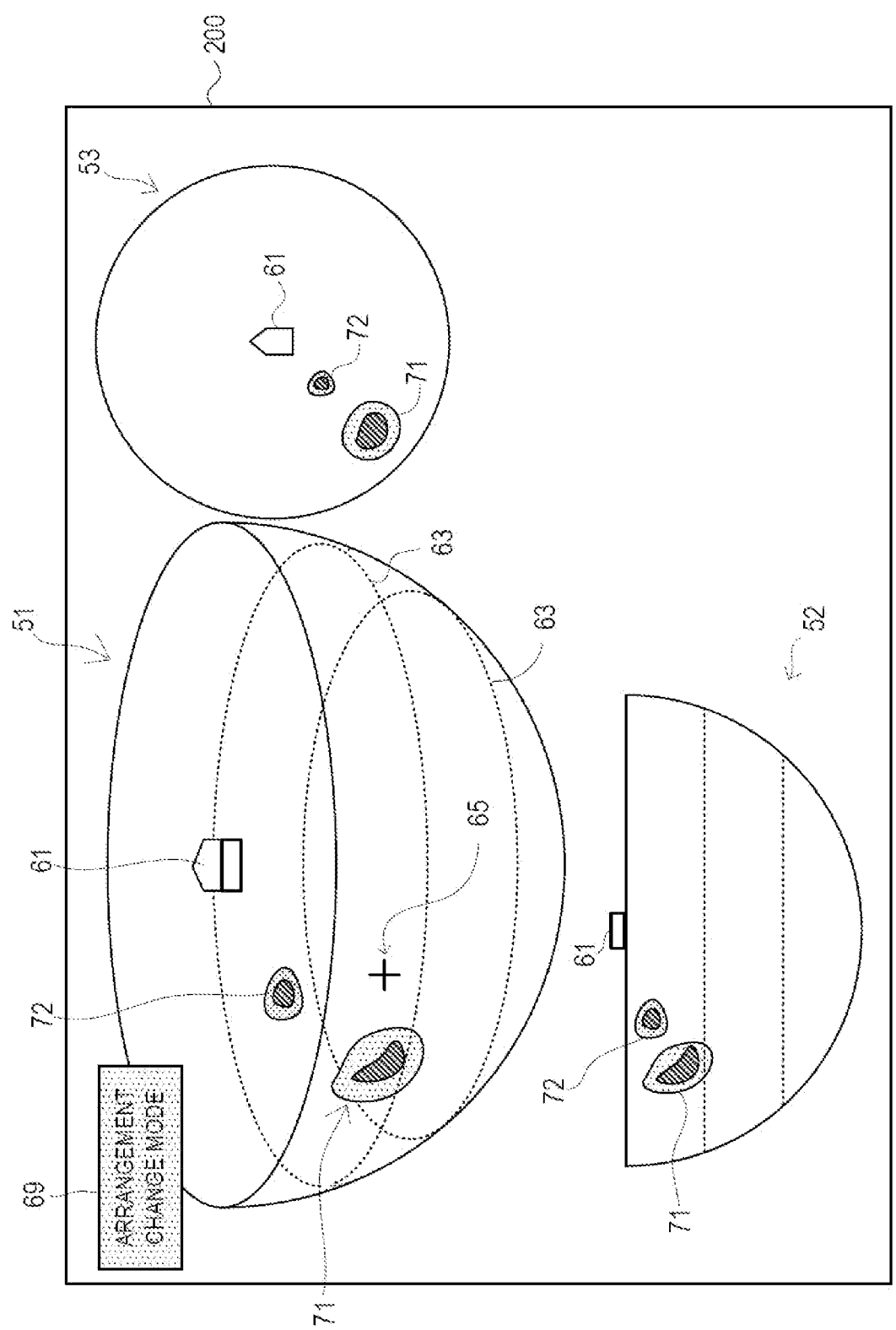

Further, when a wheel operation of the mouse is performed in the state where the mouse cursor exists in the operation target view, the information processing device 20 may change the size of each operation target view in the screen 200 according to the wheel operation. For example, as illustrated in FIG. 22, when a mouse wheel is rotated forward in the state where the mouse cursor 65 exists in the perspective view 51, the information processing device 20 may determine that a zoom-in instruction of the perspective view 51 is given and zoom in the perspective view 51. In other words, a ratio of the perspective view 51 occupying the screen 200 may become larger. On the contrary, if a mouse wheel operation in the opposite direction (a rearward rotation) is performed, the perspective view 51 may be zoomed out. The same handling may be applied to other views 52 and 53.

Each view may be zoomed in and/or zoomed out centering on the position of the mouse cursor 65. Note that, without being limited to this configuration, the zooming may be carried out centering on a given reference position (e.g., the position of the ship S).

The user can freely change the size and the position of each view by combining the move operation and zoom operation as described above (see FIG. 23). In other words, the user can arrange each view in arbitrary sizes and at arbitrary positions in the display screen 200. Note that, FIG. 23 illustrates a state where the size and the position of each view are changed based on the move operation and the zoom operation to the views 51 and 52 and the move operation to the top view 53.

Moreover, when the user combines the operation in the "arrangement change mode" and the operation in the "rotation mode," each view image in which the size and the position of each view are freely changed and the viewpoint is freely changed (rotating the perspective view 51 about the axis AX1) can be presented to the user.

Moreover, the user can also specify a display position and a display size of each view immediately after the device is rebooted (initial state) by operating similarly.

<1-7. Effects of First Embodiment>

As described above, each pixel included in the plurality of views 50 (51, 52, and 53) may be associated with the plurality of pieces of information including the first information F1 displayed in the screen 200 and the second information F2 indicative of the view to which the pixel belongs among the plurality of views 50. Therefore, it is possible to easily acquire the information related to the view to which the pixel belongs, based on the second information F2. As a result, it is possible to determine the target area of the gesture more appropriately out of the plurality of areas respectively corresponding to the plurality of views. In more detail, by identifying the operation target view which is the target view of operation based on the second information F2 associated with the target pixel of operation by the user, it is possible to determine the target area of the gesture more appropriately out of the plurality of areas respectively corresponding to the plurality of views.

Particularly, even when two adjacent views overlap with each other (in appearance) (see FIG. 23), the view to which the pixel belongs may appropriately be determined by using the second information F2 on the pixel in the overlapped area. Therefore, also when the target pixel of operation by the user is the pixel in the overlapped area, it is possible to determine the operation target view (the target area of the gesture) which is the target view of operation more appropriately based on the second information F2 associated with the target pixel.

Moreover, as described above, each view may have various shapes other than the rectangular shape (e.g., the vertically combined shape of the two ellipses, a lower semicircular shape, and a circular shape). That is, it is possible to increase the degree of freedom in the shape. Further, since the second information F2 (view identification information) is stored so as to be associated with each pixel as described above, it is possible to identify the operation target view easily while improving the degree of freedom in the shape.

Thus, it is possible to determine the operation target view (target area of gesture) more appropriately, while increasing the degree of freedom in the shape of each view, and the degree of freedom in the arrangement of each view.

Moreover, in this embodiment, since the operation target view is automatically identified according to the position of the mouse cursor, the user does not need to press a given button (operation target view change button) in order to change the operation target view. Therefore, the user can specify the operation target view easily.

Moreover, in this embodiment, the operation target view is identified according to the position of the mouse cursor, and the processing for the mouse operation is automatically changed according to the operation target view. For example, the content of the viewpoint change operation (rotation of the object) is changed according to which view among the perspective view 51 and the top view 53 a similar downward drag is performed. In detail, when a downward drag is performed to the perspective view 51, the viewpoint rotation about the axis AX2 may be performed, and when a downward drag is performed to the top view 53, the viewpoint rotation on the axis AX1 is performed. Thus, the suitable operation according to the view may be performed automatically.

<1-8. Modifications According to First Embodiment>

Note that, in the first embodiment, the correction of the view (view image) is performed only for the operation target view, and the correction of the view is not changed for views other than the operation target view. However, the present disclosure is not limited to this configuration.

In detail, when the view modification instruction to the operation target view is given, at least one of the plurality of views other than the operation target view may also be corrected in addition to the operation target view. In other words, the view correction of views other than the operation target view may be performed in an interlocked manner with the operational instruction to the operation target view.

Figure 18:
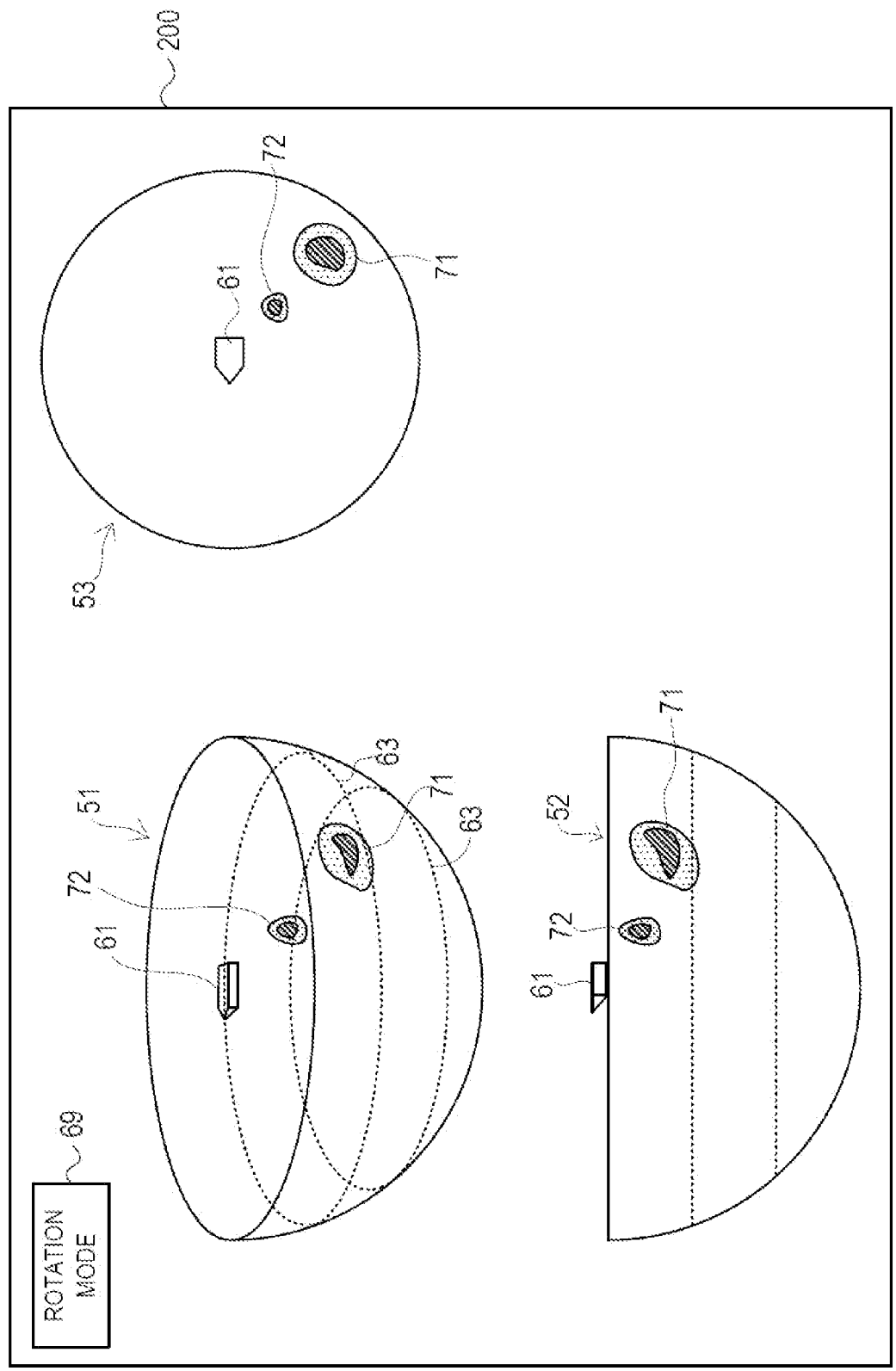
FIG. 18 is a view illustrating a state where a plurality of views are changed in an interlocked fashion.

For example, when the operation target view is the perspective view 51, and the view modification instruction is given to the perspective view 51, and the viewpoint of the perspective view 51 is rotated on the axis AX1 to update the perspective view 51 (see FIG. 7), the screen 200 may be changed as illustrated in FIG. 18. In detail, the viewpoint of the perspective view 51 may be rotated on the axis AX1 (see FIG. 7 etc.) and the perspective view 51 may be updated, and the viewpoint of the side view 52 may be rotated on the axis AX1 (see FIG. 11 etc.) and the side view 52 may also be updated (see FIG. 18). Further, the top view 53 may be rotated on the axis AX1 (see FIG. 14 etc.) and the top view 53 may also be updated (see FIG. 18).

2. Second Embodiment

The second embodiment is a modification of the first embodiment. Below, differences from the first embodiment are mainly described.

In the second embodiment, a touch panel type display device (hereinafter, also simply referred to as a "touch panel") may be provided as the display unit 31, and a configuration in which the gesture (also referred to as the "touch gesture") is accepted by using the touch panel is described. In the second embodiment, the touch panel may be provided as the user interface 34. In other words, the touch panel may function as the display unit and also may function as the operation input unit.

In the second embodiment, an instruction similar to the instruction given by the drag using the mouse gesture in the first embodiment may be given by one-finger drag of the touch gesture.

Moreover, in the second embodiment, the two-finger operation by the touch gesture (the operation performed simultaneously with two fingers (also referred to as a "multi-touch operation")) may also be accepted. The two-finger operation may include a pinch-in, a pinch-out, a two-finger drag, and a two-finger rotation.

The pinch-in operation may be an operation for narrowing a mutual interval of two fingers on the screen, and the pinch-out operation may be an operation for stretching the mutual interval of the two fingers on the screen. The two-finger drag (may also be referred to as a "slide" or "swipe") may be an operation for simultaneously moving the two fingers in a certain direction (in the same direction) on the screen. Moreover, the two-finger rotation may be an operation to change a direction of a line connecting positions of the two fingers on the screen according to a movement of the two fingers (e.g., moving the two fingers to the mutually opposite directions centering on a certain position on the screen).

In the second embodiment, by utilizing the multi-touch gesture among a plurality of gestures (in detail, the pinch-in, the pinch-out, the two-finger drag, the two-finger rotation), it is possible to realize the positional change and the magnification change of the operation target view, without changing the operation mode between "the rotation mode" and "the arrangement change mode."

In detail, when the two-finger drag is performed in the operation target view, it may be determined that a movement instruction to the operation target view (a display position change instruction in the screen) is given. Then, the operation target view (e.g., the top view 53) may be moved to a user's desired position according to the movement instruction (see FIG. 21). Note that the two-finger drag may be identified as the move instruction operation for moving the operation target view in the screen, regardless of the type of operation target view.

Moreover, when the two-finger pinch operation (e.g., the pinch-in or the pinch-out) is performed to the operation target view, it may be determined that a magnification change instruction to the operation target view (a change instruction of the display size (display area) in the screen) is given. Then, the size of the operation target view may be changed according to the magnification change instruction. In detail, it may be determined that the pinch-out is a zoom-in instruction to the operation target view, and the operation target view (e.g., the perspective view 51) is zoomed-in according to the pinch-out (see FIG. 22). On the other hand, it may be determined that the pinch-in is a zoom-out instruction to the operation target view, and the operation target view is zoomed-out according to the pinch-in. Note that the two-finger pinch operation may be identified as the magnification change instruction operation for zooming the operation target view in the screen, regardless of the type of operation target view.

Moreover, the two-finger rotation may be identified as an operation for giving the "rotation instruction about the vertical axis AX1," regardless of the type of operation target view. That is, even if the operation target view of the two-finger rotation is any one of the perspective view 51, the side view 52, and the top view 53, it may be determined that the two-finger rotation is the "rotation instruction about the vertical axis AX1."

Moreover, when the one-finger drag to each operation target view is given, it may be determined that a similar instruction to the drag of the mouse in the "rotation mode" is given.

In detail, when the one-finger drag is performed as the touch operation to the perspective view 51, and the instructed displacement amount ΔU of the drag is larger than the instructed displacement amount ΔV, the "rotation instruction about the vertical axis AX1" may be identified as the instructed content of the instructing gesture (see FIGS. 7 and 8). Similarly, when the instructed displacement amount ΔU of the drag is smaller than the instructed displacement amount ΔV, the "rotation instruction about the horizontal axis AX2" may be identified as the instructed content of the instructing gesture (see FIGS. 9 and 10).

Figure 12:
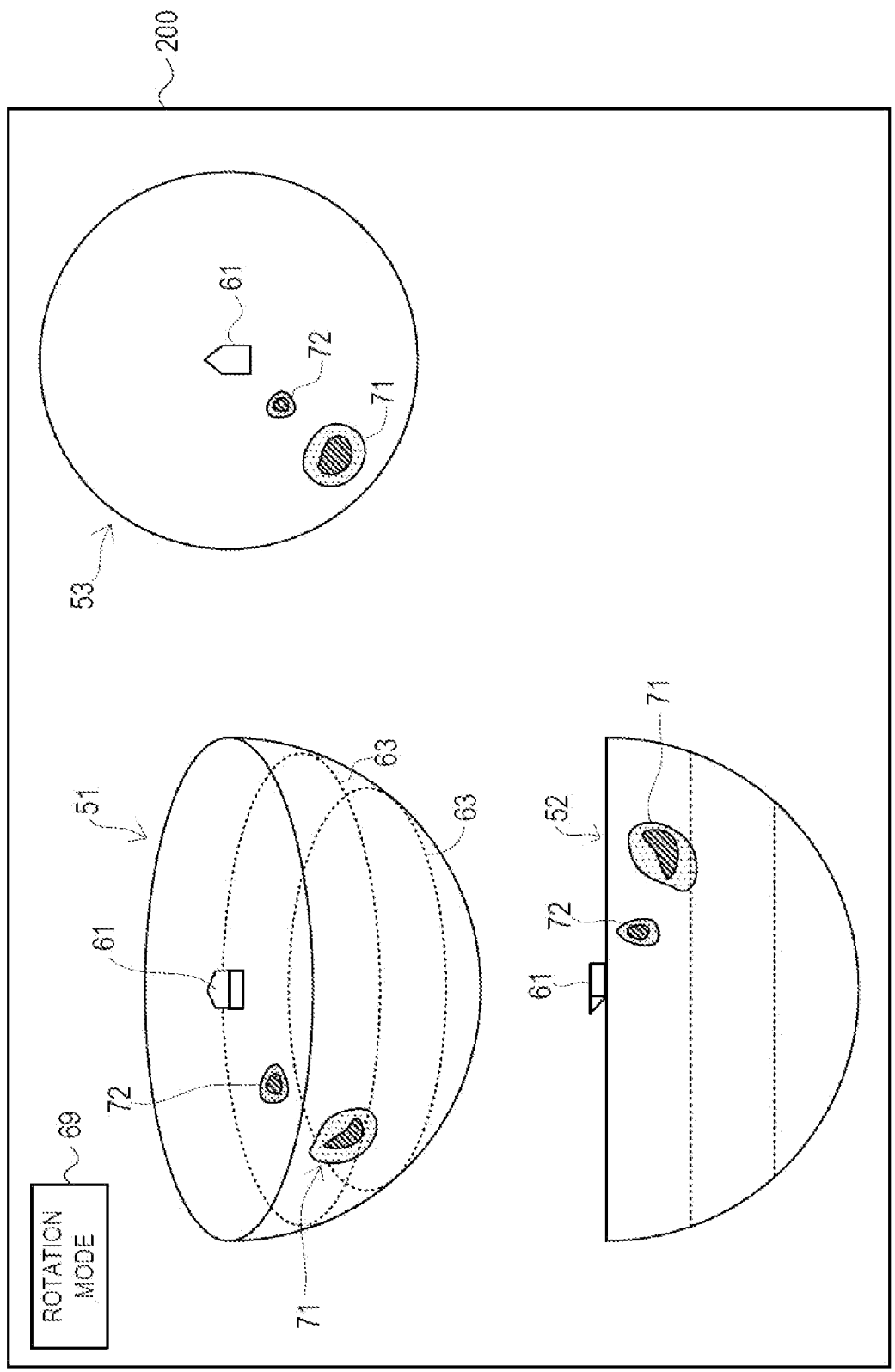
FIG. 12 is a view illustrating a changed side view.

Moreover, when the one-finger drag is performed as the touch operation to the side view 52, and the instructed displacement amount ΔU of the drag is larger than the instructed displacement amount ΔV, the "rotation instruction about the vertical axis AX1" may be identified as the instructed content of the instructing gesture (see FIGS. 11 and 12). Similarly, when the instructed displacement amount ΔU of the drag is smaller than the instructed displacement amount ΔV (see FIG. 13), "not changing the viewpoint" may be identified as the instructed content of the instructing gesture.

Moreover, when the one-finger drag is performed as the touch operation to the top view 53, the "rotation instruction about the vertical axis AX1" may be identified as the instructed content of the instructing gesture, regardless of the magnitude correlation of the instructed displacement amount ΔU and the instructed displacement amount ΔV of the drag (see FIGS. 14 to 17).

Similar effects as those of the first embodiment can be acquired also from the second embodiment.

Moreover, in the second embodiment, the operation target view may automatically be identified according to the touch starting position of the touch gesture. In detail, the operation target view may be identified automatically based on the second information F2 associated with the pixel of the touch starting position. Therefore, the user does not have to depress the given button each time he/she changes the operation target view. Therefore, the user can identify the operation target view easily.

Moreover, in the second embodiment, mutually different instructed contents may be assigned to the two-finger operation (multi-touch operation) and one-finger operation (single-touch operation). By suitably using the plurality of kinds of touch operations separately, a large number of instructed contents may be given so as to be distinguished from each other. Therefore, it does not require the mode change operation being performed, for example, by pressing the mode change button 69. In detail, the viewpoint change operation (rotation), the move operation of each view, and/or the magnification change operation of each view may be realized by only the touch operation.

3. Modifications

As described above, although the embodiments of the present disclosure are described, the present disclosure is not limited to the configurations described above.

For example, although in the first embodiment etc. the movement instruction and/or the magnification change instruction of the operation target view is performed accompanied by the operation other than the mouse operation (in detail, the pressing operation of the mode change button 69), the movement instruction and/or the magnification change instruction of the operation target view may be distinguished by a combination of the button operation of the mouse, the move operation of the mouse, and the mouse wheel operation, without being limited to the above configuration. In detail, the "movement of the view" may be instructed by an operation of moving the mouse while pressing both the left and right buttons of the mouse, and the "magnification change (zoom-in and zoom-out) of the view" may be instructed by an operation of rotating the mouse wheel while pressing the left button of the mouse. According to this configuration, various kinds of instructions may be given without being accompanied by the pressing of the mode change button 69.

Moreover, in the above embodiments, although the underwater detection apparatus is provided with the transducer which functions as the transmitter and also functions as the receiver, the underwater detection apparatus may be provided with the transmitter and the receiver separately, without being limited to the above configuration.

Moreover, in the above embodiments, although the data set is acquired using the scanning sonar which forms the transmission beam all at once toward all the underwater directions centering on the ship, it is not limited to this configuration. For example, the data set may be acquired using an underwater detection apparatus provided with a searchlight sonar (PPI sonar) which rotates a transmission beam and a receiving beam.

Moreover, in the above embodiments, although the data set (e.g., school-of-fish data) detected from the underwater environment are acquired related to the underwater target object (e.g., a school of fish), it is not limited to this configuration. For example, the data set (e.g., meteorological data) detected from the air environment may be acquired related to a target object (e.g., moisture) in the air. Alternatively, the data set (e.g., medical data) detected from the environment in a living body may be acquired related to a target object in a human body (e.g., an internal organ).

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A data processing apparatus, comprising:
processing circuitry configured to:
acquire a data set from target detected by a detection apparatus;
perform rendering of the data set, and generate a plurality of views arranged on a screen, the plurality of views comprising at least two of a perspective view, a side view and a top view, wherein the perspective view and the side view are displayed with respect to a first axis in a direction along the screen, and the top view is displayed with respect to the first axis corresponding to a direction perpendicular to the screen, each view of the plurality of views being rotatable about the first axis;
each view of the plurality of views comprising a plurality of pixels; and
each pixel included in the plurality of views being associated with a plurality of pieces of information including a first information displayed on the screen and a second information that indicates a view among the plurality of views to which the pixel belongs; and
select one view of the plurality of views and rotate the one view as an operation view about the first axis based on an instruction gesture, which is a view modification instruction, while maintaining the other of the plurality of views in their existing rotation state.

2. The data processing apparatus of claim 1, further comprising: a user interface configured to receive a user operation on the plurality of views; wherein the processing circuitry is configured to: acquire the second information associated with an operation pixel subject to the user operation, specify an operation view subject to the user operation based on the second information of the operation pixel, detect a gesture related to the user operation as an instruction gesture, and modify the operation view based on the instruction gesture, when the instruction gesture is a view modification instruction.

3. The data processing apparatus of claim 2, wherein: the plurality of views comprises the perspective view; and when the operation view is the perspective view, and a displacement amount of the instruction gesture in a horizontal direction in the screen is larger than a displacement amount of the instruction gesture in a vertical direction in the screen, the processing circuitry is configured to generate a view image as a new perspective view by rotating a viewpoint of the perspective view about the first axis in a three-dimensional space relating to the data set, the first axis being in the direction which is the vertical direction in the screen in the perspective view.

4. The data processing apparatus of claim 2, wherein: the plurality of views comprises the perspective view; and when the operation view is the perspective view, and a displacement amount of the instruction gesture in a horizontal direction in the screen is smaller than a displacement amount of the instruction gesture in a vertical direction in the screen, the processing circuitry is configured to generate a view image as a new perspective view by rotating a viewpoint of the perspective view about a second axis in a three-dimensional space relating to the data set, the second axis being the horizontal direction in the screen in the perspective view.

5. The data processing apparatus of claim 2, wherein: the plurality of views comprises the side view; and when the operation view is the side view, and a displacement amount of the instruction gesture in a horizontal direction in the screen is larger than a displacement amount of the instruction gesture in a vertical direction in the screen, the processing circuitry is configured to generate a view image as a new side view by rotating a viewpoint of the side view about the first axis in a three-dimensional space relating to the data set, the first axis being in the direction which is the vertical direction in the screen in the side view.

6. The data processing apparatus of claim 2, wherein: the plurality of views comprises the side view; and when the operation view is the side view, and a displacement amount of the instruction gesture in a horizontal direction in the screen is smaller than a displacement amount of the instruction gesture in a vertical direction in the screen, the processing circuitry is configured to inhibit a rotation of a viewpoint of the side view.

7. The data processing apparatus of claim 2, wherein: the plurality of views comprises the top view; and when the operation view is the top view, and a displacement instruction in a horizontal direction or a vertical direction in the screen is given based on the instruction gesture, the processing circuitry is configured to generate a view image as a new top view by rotating a viewpoint of the top view about the first axis in a three-dimensional space relating to the data set.

8. The data processing apparatus of claim 1, further comprising: a transducer configured to transmit a transmission wave, receive a reception wave comprising a reflection of the transmission wave on the target, and generate a reception signal based on the reception wave; wherein the processing circuitry is configured to generate the data set based on the reception signal, the reception wave being received from a three-dimensional space extending outwardly from the transducer.

9. The data processing apparatus of claim 1, wherein all of the views are rotatable about the first axis; and the processing circuitry is configured to rotate one of the views about the first axis while maintaining all of the other views from rotating about the first axis while the one of the views is being rotated about the first axis.

10. A data processing method, comprising:
acquiring a data set from target detected by a detection apparatus;
performing rendering of the data set, and generating a plurality of views on a screen, the plurality of views comprising at least two of a perspective view, a side view and a top view, wherein the perspective view and the side view are displayed with respect to a first axis in a direction along the screen, and the top view is displayed with respect to the first axis corresponding to a direction perpendicular to the screen, each view of the plurality of views being rotatable about the first axis,
each view of the plurality of views comprising a plurality of pixels; and
each pixel included in the plurality of views being associated with a plurality of pieces of information including a first information displayed on the screen and a second information that indicates a view among the plurality of views to which the pixel belongs; and
selecting one view of the plurality of views and rotating the one view as an operation view about the first axis based on an instruction gesture, which is a view modification instruction, while maintaining the other of the plurality of views in their existing rotation state.

11. The data processing method of claim 10, further comprising: receiving, by a user interface, a user operation on the plurality of views; acquiring the second information associated with an operation pixel subject to the user operation, specifying an operation view subject to the user operation based on the second information of the operation pixel, detecting a gesture related to the user operation as an instruction gesture, and modifying the operation view based on the instruction gesture, when the instruction gesture is a view modification instruction.

12. The data processing method of claim 11, wherein: the plurality of views comprises the perspective view; and when the operation view is the perspective view, and a displacement amount of the instruction gesture in a horizontal direction in the screen is larger than a displacement amount of the instruction gesture in a vertical direction in the screen, generating a view image as a new perspective view by rotating a viewpoint of the perspective view about the first axis in a three-dimensional space relating to the data set, the first axis being in the direction which is the vertical direction in the screen in the perspective view.

13. The data processing method of claim 11, wherein: the plurality of views comprises the perspective view; and when the operation view is the perspective view, and a displacement amount of the instruction gesture in a horizontal direction in the screen is smaller than a displacement amount of the instruction gesture in a vertical direction in the screen, generating a view image as a new perspective view by rotating a viewpoint of the perspective view about a second axis in a three-dimensional space relating to the data set, the second axis being the horizontal direction in the screen in the perspective view.

14. The data processing method of claim 10, wherein all of the views are rotatable about the first axis; and during the rotating, one of the views is rotated about the first axis while all of the other views are maintained from rotating about the first axis.

15. A non-transitory computer-readable medium having stored thereon computer-executable instructions which, when executed by a computer, cause the computer to:
acquire a data set from target detected by a detection apparatus;
perform rendering of the data set, and generate a plurality of views on a screen, the plurality of views comprising at least two of a perspective view, a side view and a top view, wherein the perspective view and the side view are displayed with respect to a first axis in a direction along the screen, and the top view is displayed with respect to the first axis corresponding to a direction perpendicular to the screen, each view of the plurality of views being rotatable about the first axis,
each view of the plurality of views comprising a plurality of pixels; and
each pixel included in the plurality of views being associated with a plurality of pieces of information including a first information displayed on the screen and a second information that indicates a view among the plurality of views to which the pixel belongs; and
select one view of the plurality of views and rotate the one view as an operation view about the first axis based on an instruction gesture, which is a view modification instruction, while maintaining the other of the plurality of views in their existing rotation state.

16. The non-transitory computer-readable medium having stored thereon computer-executable instructions of claim 15, which, when executed by a computer, cause the computer to: receive, by a user interface, a user operation on the plurality of views; acquire the second information associated with an operation pixel subject to the user operation, specify an operation view subject to the user operation based on the second information of the operation pixel, detect a gesture related to the user operation as an instruction gesture, and modify the operation view based on the instruction gesture, when the instruction gesture is a view modification instruction.

17. The non-transitory computer-readable medium having stored thereon computer-executable instructions of claim 16, wherein: the plurality of views comprises the perspective view; and when executed by a computer, the computer-executable instructions cause the computer to: when the operation view is the perspective view, and a displacement amount of the instruction gesture in a horizontal direction in the screen is larger than a displacement amount of the instruction gesture in a vertical direction in the screen, generate a view image as a new perspective view by rotating a viewpoint of the perspective view about the first axis in a three-dimensional space relating to the data set, the first axis being in the direction which is the vertical direction in the screen in the perspective view.

18. The non-transitory computer-readable medium of claim 15, wherein all of the views are rotatable about the first axis; and the computer-executable instructions, when executed by a computer, cause the computer to rotate one of the views about the first axis while maintaining all of the other views from rotating about the first axis.

* * * * *